United States Patent
Ooyama et al.

(10) Patent No.: US 8,262,747 B2
(45) Date of Patent: Sep. 11, 2012

(54) CATHODE ACTIVE MATERIAL, CATHODE, NONAQUEOUS ELECTROLYTE BATTERY, AND METHOD FOR MANUFACTURING CATHODE

(75) Inventors: Tomoyo Ooyama, Fukushima (JP);
Yukifumi Takeda, Fukushima (JP);
Masanori Soma, Fukushima (JP);
Hideki Nakai, Fukushima (JP)

(73) Assignee: Sony Corporation, Tokyo (JP)

( * ) Notice: Subject to any disclaimer, the term of this patent is extended or adjusted under 35 U.S.C. 154(b) by 1172 days.

(21) Appl. No.: 12/059,939

(22) Filed: Mar. 31, 2008

(65) Prior Publication Data

US 2008/0254368 A1    Oct. 16, 2008

(30) Foreign Application Priority Data

Mar. 30, 2007   (JP) ............... P2007-093381
Oct. 3, 2007    (JP) ............... P2007-259336

(51) Int. Cl.
*H01M 4/13*   (2010.01)
*H01M 4/58*   (2010.01)
*H01M 4/64*   (2006.01)
*H01M 4/72*   (2006.01)
*H01M 4/82*   (2006.01)
*H01M 6/00*   (2006.01)

(52) U.S. Cl. ............... 29/623.5; 29/623.1; 429/231.95; 429/233

(58) Field of Classification Search ............ 29/623.1, 29/623.5; 429/231.95, 233, 223, 224
See application file for complete search history.

(56) References Cited

U.S. PATENT DOCUMENTS

| | | | |
|---|---|---|---|
| 4,405,419 A * | 9/1983 | Misawa et al. | 205/352 |
| 6,416,902 B1 | 7/2002 | Miyajaka | |
| 6,913,855 B2 * | 7/2005 | Stoker et al. | 429/231.95 |
| 7,192,674 B2 * | 3/2007 | Yoshimura et al. | 429/231.95 |
| 7,799,301 B2 * | 9/2010 | Kajiya et al. | 423/265 |

FOREIGN PATENT DOCUMENTS

| | | |
|---|---|---|
| JP | 02-068855 | 3/1990 |
| JP | 2-244665 | 9/1990 |
| JP | 04-328277 | 11/1992 |
| JP | 07-192720 | 7/1995 |
| JP | 08-138670 | 5/1996 |
| JP | 8-213014 | 8/1996 |
| JP | 09-231975 | 9/1997 |
| JP | 10-079244 | 3/1998 |
| JP | 10-302768 | 11/1998 |
| JP | HEI 10-294100 | 11/1998 |
| JP | 11-025980 | 1/1999 |
| JP | 11-067233 | 3/1999 |
| JP | 11-086846 | 3/1999 |
| JP | 11-273674 | 10/1999 |
| JP | 11-307094 | 11/1999 |
| JP | 2000-090917 | 3/2000 |
| JP | 2002-086993 | 10/2002 |
| JP | 2004-95188 | 3/2004 |
| JP | 3543437 | 4/2004 |
| JP | 2004-192896 | 7/2004 |
| JP | 2004-296098 | 10/2004 |
| JP | 2005-11688 | 1/2005 |
| JP | 2005-259703 | 9/2005 |
| JP | 2005-268017 | 9/2005 |
| JP | 2006-286240 | 10/2006 |
| JP | 2006-318815 | 11/2006 |
| JP | 2007-005267 | 1/2007 |
| JP | 2007-048525 | 2/2007 |
| JP | 2007-335331 | 12/2007 |
| JP | 2008-027778 | 2/2008 |
| JP | 2008-251434 | 10/2008 |

* cited by examiner

*Primary Examiner* — Patrick Ryan
*Assistant Examiner* — Julian Anthony
(74) *Attorney, Agent, or Firm* — K&L Gates LLP

(57) ABSTRACT

A cathode active material has: a lithium composite oxide which contains the highest proportion of nickel among constituent metal elements except lithium; and a phosphorus compound which is contained near the surface of the lithium composite oxide, a cathode including the cathode active material, and a method for manufacturing the cathode.

9 Claims, 26 Drawing Sheets

FIG. 9A
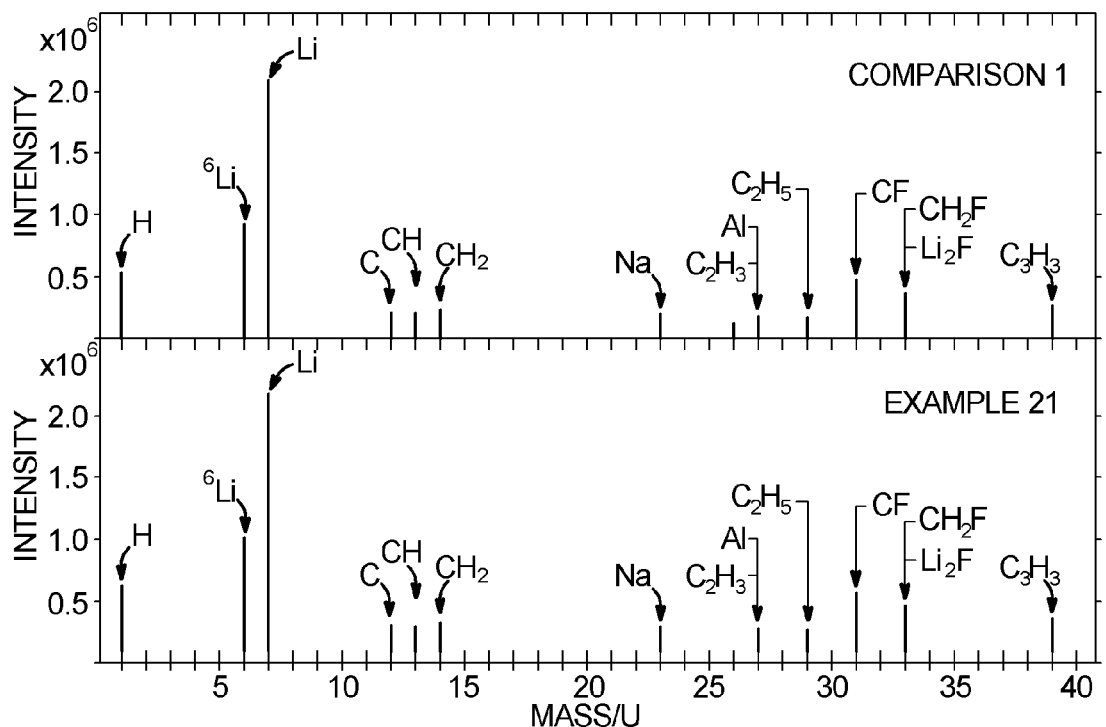
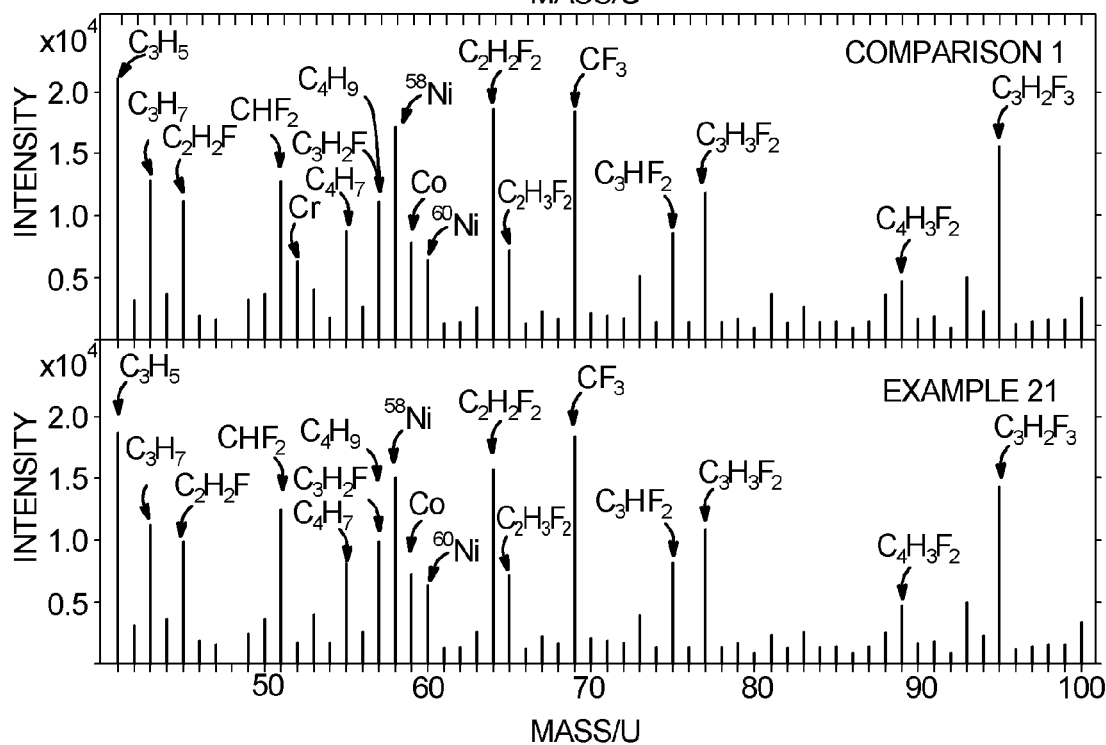

FIG. 10B
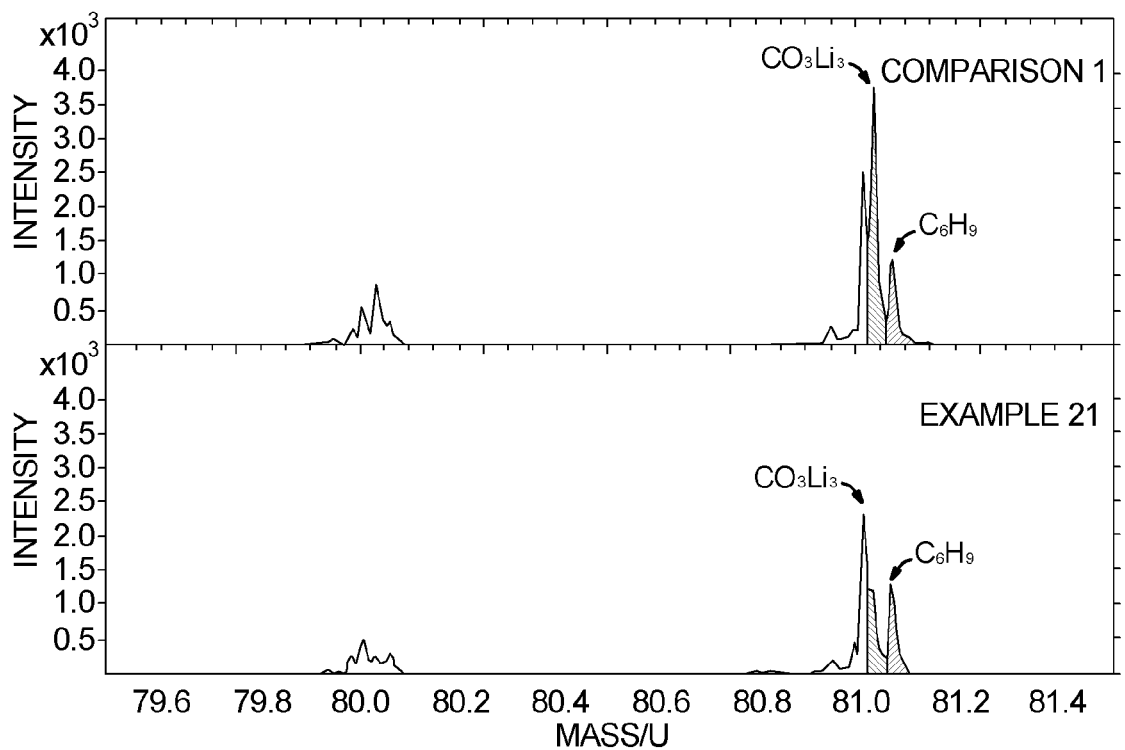
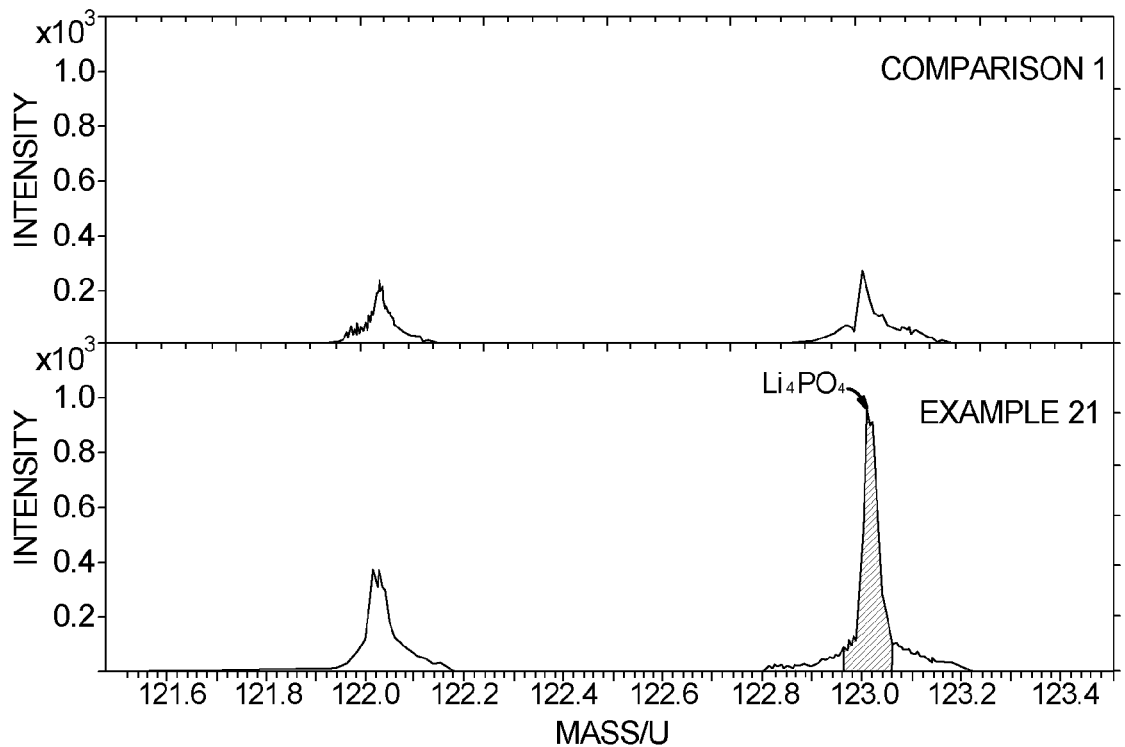

FIG. 11
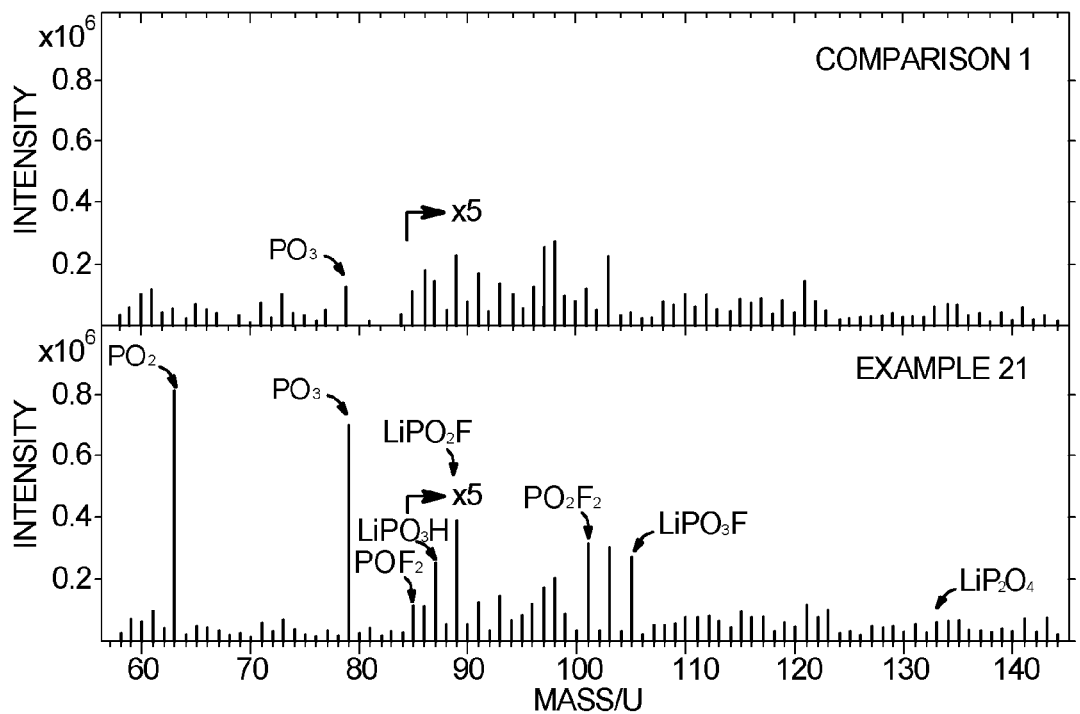
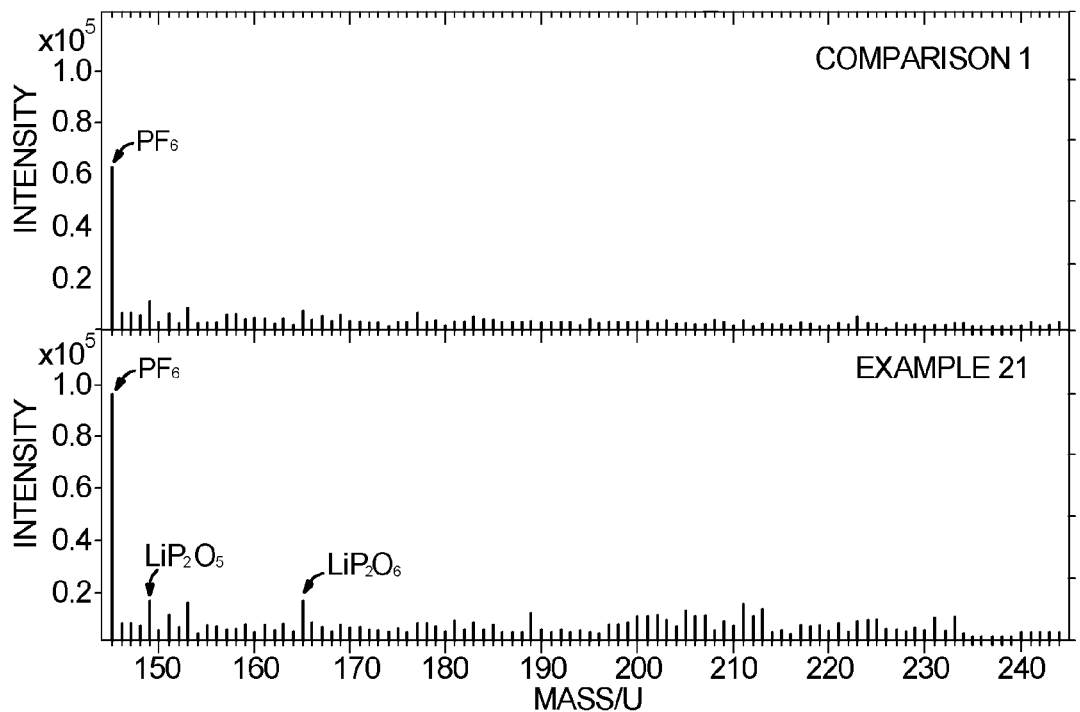

FIG. 21
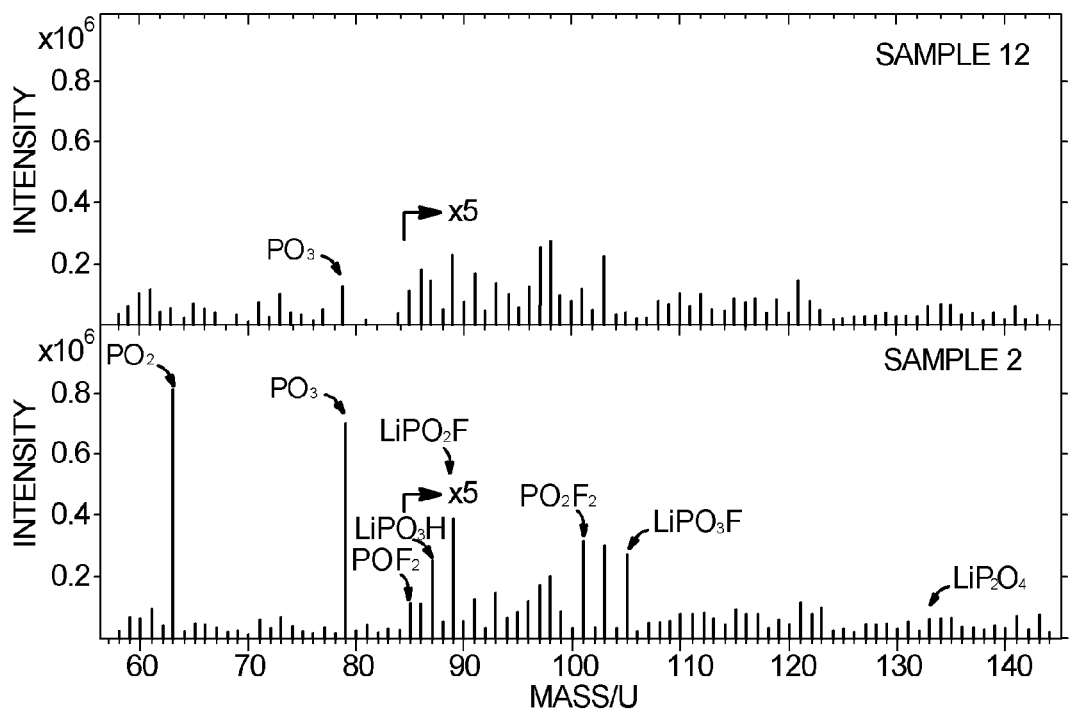
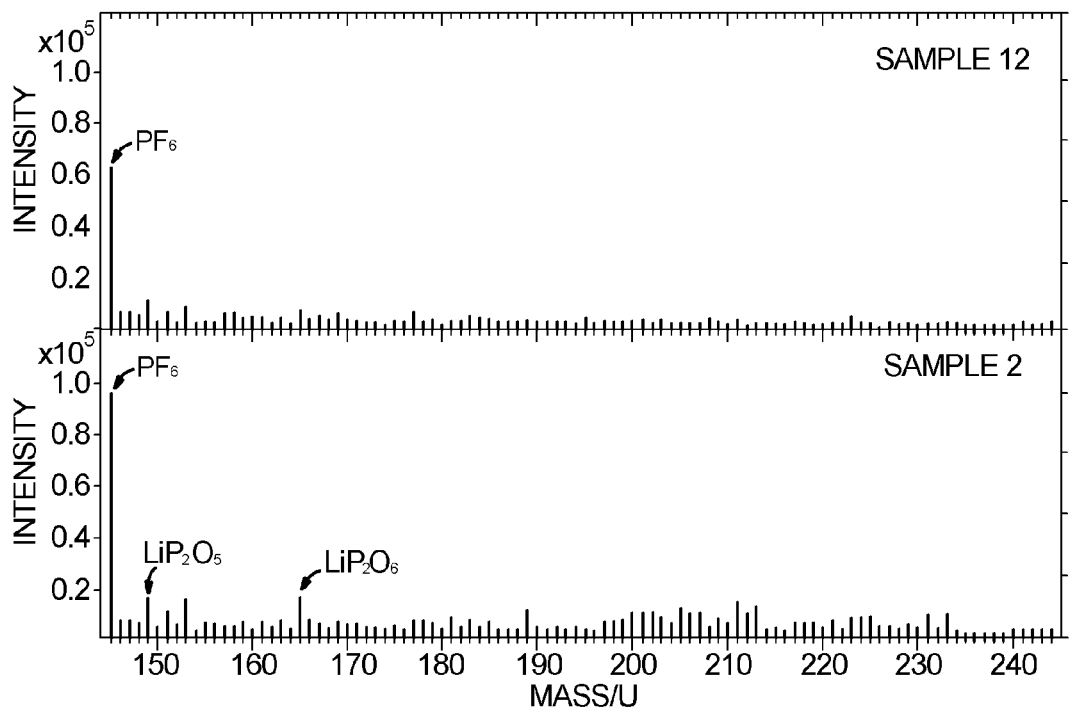

CATHODE ACTIVE MATERIAL, CATHODE, NONAQUEOUS ELECTROLYTE BATTERY, AND METHOD FOR MANUFACTURING CATHODE

CROSS REFERENCES TO RELATED APPLICATIONS

The present application claims priority to Japanese Patent Application No. 2007-093381 filed on Mar. 30, 2007 and Japanese Patent Application No. 2007-259336 filed on Oct. 3, 2007, the entire contents of which is being incorporated herein by reference.

BACKGROUND

The present application relates to a cathode active material, a cathode, a nonaqueous electrolyte battery, and a method for manufacturing a cathode. More specifically, it relates to a cathode active material containing a lithium composite oxide, a cathode, a nonaqueous electrolyte battery, and a method for manufacturing a cathode for nonaqueous electrolytic solution secondary batteries.

In recent years, a portable equipment, such as a video camera and a notebook computer is widely used, and there is a strong demand for a secondary battery having a small size and a high capacity. An example of the secondary battery currently in use is a nickel-cadmium battery formed by using an alkali electrolytic solution. The battery voltage is as low as about 1.2 V, and thus it is difficult to improve the energy density. Therefore, a lithium metal secondary battery using lithium metal having a specific gravity of 0.534 which is the lightest among the simple substances of solids, an extremely base potential, and the highest current capacity per unit mass among metal anode materials has been developed.

However, as for the secondary battery formed using lithium metal as an anode, when the lithium metal secondary battery is charged and discharged, lithium is grown into a dendrite form in the anode, which cause problems such as the deterioration in the cycle characteristics of the secondary battery and the occurrence of an internal short circuit due to lithium penetrating through a separator that is arranged so that the cathode is not contact with the anode.

Then, for example, as disclosed in Japanese Patent Application Laid-Open (JP-A) No. 62-90863, a secondary battery in which a carbonaceous material such as coke is used for an anode, and charge and discharge cycles are repeated by doping or de-doping an alkali metal ion has been proposed. Thus, it is found that the defect of the deterioration of the anode caused by repeating charge and discharge cycles can be avoided by using the secondary battery.

On the other hand, as a cathode active material capable of obtaining a battery voltage of approximately 4 V, inorganic compounds such as transition metal oxides including alkali metal and transition metal chalcogens are known. Among them, a lithium composite oxide such as lithium cobalt oxide or lithium nickel oxide holds great promise in terms of a high potential, stability and long life.

Among them, a high-nickel cathode active material typified by $Li_xNiO_2$ is a lithium composite oxide which contains the highest proportion of nickel Ni among constituent metal elements except lithium. The cathode active material shows a higher discharging capacity as compared to $Li_xCoO_2$ and is an attractive cathode material.

However, larger amounts of LiOH which is a residue of a cathode raw material (an impurity) as well as $Li_2CO_3$ which is produced by carbon dioxide gas absorption by LiOH in the air are present on the surface of the high-nickel cathode active material as compared to that of $Li_xCoO_2$.

Since LiOH in the impurities is an alkali component, when the cathode active material is kneaded with polyvinylidene fluoride (PVdF) to be used as a binder and N-methyl-2-pyrrolidone (NMP) in a step of fabricating a cathode, or when the solvent is applied after the kneading, the gelation of the solvent is caused.

$Li_2CO_3$ in the impurities is hardly dissolved in the solvent or the electrolytic solution, however, it is decomposed by the charging and discharging operation, thereby generating gases $CO_2$ and $CO_3$. These gas components increase the pressure inside the battery and lead to the expansion of the battery as well as the deterioration of cycle life. In the case where an exterior member of the battery is made of a stainless steel (SUS) can or an aluminum can and has a high strength, the battery can be damaged by the increased internal pressure due to the generation of gas.

As a method for preventing the gelation, there is a method for neutralizing the alkali component so as to be $Li_2CO_3$ by once storing the high-nickel cathode active material in carbon dioxide gas. However, the pH of the cathode active material after the neutralization is higher than that of $Li_xCoO_2$. Therefore, the decomposition of the electrolytic solution is facilitated and gases $CO_2$ and $CO_3$ are generated.

Thus, as another method for preventing the gelation, a method for preventing the gelation as well as inhibiting the generation of gas is disclosed in JP-A No. 2006-286240. In this method, the residual LiOH is fixed as LiF by treating the cathode active material with a fluorine gas. Therefore, the gelation can be prevented and the generation of gas can be inhibited.

In addition to the above-described problems, there are further problems that the volume density of the electrode is low due to the composition and shape of the high-nickel cathode active material and the winding characteristics of an electrode are poor.

In order to compare a typical shape of $Li_xCoO_2$ with a shape of $Li_xNiO_2$, electron microscope images of one example of $Li_xCoO_2$ and one example of $Li_xNiO_2$ are shown in FIGS. 1A and 1B. FIG. 1A shows an electron microscope image of an example of $Li_xCoO_2$. FIG. 1B shows an electron microscope image of an example of $Li_xNO_2$. In the high-nickel cathode active material, a true specific gravity of the powder is lower as compared to that of $Li_xCoO_2$, and thus it may be impossible to improve the reduction in the volume density of the electrode by the composition.

Further, a battery with a cylindrical shape can be produced by using the high-nickel cathode active material. In the case where a battery with a flat type, used for portable telephones, is produced, a curve is tight at the time of folding the electrode because the winding characteristics of an electrode are poor. Furthermore, the electrode may be broken or cut at the time of folding the electrode by winding or at the time of molding by pressing after the winding, and therefore it is difficult to produce the battery with a flat type.

In related art, a method for improving the strength by increasing the thickness of electrode foil-shaped or a method for reducing the volume density of the cathode active material applied to the electrode foil has been proposed as a method for reducing the cracking and cutting of the electrode by winding and pressing.

The method of fluorination treatment proposed in JP-A No. 2006-286240 has the following problems (1) to (3):
(1) fluorine gas is highly toxic and difficult to handle;
(2) the internal resistance of the battery is increased by LiF produced as a by-product material and thus the capacity is decreased, and further the capacity is decreased by the corrosion due to the fluorine gas in the cathode active material; and further (3) the residual F is easily reacted with minute amounts of moisture present in the active material and the electrolytic solution to generate HF, thereby causing the cycle deterioration.

With reference to the problems of the volume density of the electrode and the winding characteristics of the electrode, when the above-described method in related art is used, the amount of the cathode active material relative to the volume of the battery is reduced. As a result, it may be impossible to obtain a sufficient capacity. Further, even if it can be wound, it is difficult to mold by pressing. The battery at a laboratory level can be fabricated by using a method for winding while the electrolytic solution is applied to the electrode or a method including the steps of winding, impregnating with the electrolytic solution, molding, and removing the excessive electrolytic solution in place of a method for molding by pressing. However, there are some problems that the composition of the electrolytic solution to be produced and the amount of the electrolytic solution become unclear.

SUMMARY

Therefore, it is desirable to provide a cathode active material, a cathode, and a nonaqueous electrolyte battery in which the gas generation can be inhibited by reducing LiOH and $Li_2CO_3$ which are impurities in high-nickel cathode active material and thus the cycle characteristics can be improved.

Furthermore, there is an another purpose of providing a cathode active material, cathode, and nonaqueous electrolyte battery which are capable of improving the winding characteristics of an electrode by changing the distribution of binders and conductive auxiliary agents in the electrode.

However, when the method for improving the strength by increasing the thickness of electrode foil-shaped or the method for reducing the volume density of the cathode active material applied to the electrode foil is used, the amount of the cathode active material relative to the volume of the battery is reduced. As a result, it may be impossible to obtain a sufficient capacity. Further, even if it can be wound, it is difficult to mold by pressing. The battery at a laboratory level can be fabricated by using a method for winding while the electrolytic solution is applied to the electrode or a method including the steps of winding, impregnating with the electrolytic solution, molding, and removing the excessive electrolytic solution in place of a method for molding by pressing. However, there are some problems that the composition of the electrolytic solution to be produced and the amount of the electrolytic solution become unclear.

Further, when $Li_xCoO_2$ is used, it is necessary to apply $Li_xCoO_2$ thickly and densely for improving the capacity of the battery and increasing the amount of the cathode active material included in the battery. However, it is difficult to resist the winding curve of the flat type battery when a thick and high-density electrode is used.

Therefore, there is a purpose of providing a method for manufacturing a cathode capable of improving the winding characteristics of an electrode by changing the distribution of binders and conductive auxiliary agents in the cathode.

In order to solve the above problems, according to an embodiment, there is provided a cathode active material including a lithium composite oxide which contains the highest proportion of nickel is contained among constituent metal elements except lithium and a phosphorus compound near the surface of the lithium composite oxide.

According to an embodiment, there is provided a cathode including the cathode active material having a lithium composite oxide which contains the highest proportion of nickel among constituent metal elements except lithium; and a phosphorus compound which is contained near the surface of the lithium composite oxide.

According to an embodiment, there is provided a nonaqueous electrolyte battery including a cathode, an anode, and an electrolyte, where the cathode has the cathode active material having a lithium composite oxide which contains the highest proportion of nickel is contained among constituent metal elements except lithium and a phosphorus compound near the surface of the lithium composite oxide.

According to an embodiment, there is provided a method for manufacturing a cathode including the steps of: mixing phosphorous acid ($H_3PO_3$) with cathode active material to prepare a cathode mixture slurry; and applying the cathode mixture slurry to a cathode current collector to form a cathode active material layer.

In an embodiment, LiOH, which is a impurity, is converted to phosphoric acid lithium with a low reactivity by treating with phosphorous acid or phosphoric acid compound and thus the amount of LiOH and $Li_2CO_3$ produced by reaction with LiOH are reduced. Therefore, the absorption of carbon dioxide gas in the air, the generation of gas, and the deterioration of cycle characteristics can be inhibited.

In an embodiment, the winding characteristics of an electrode is improved by changing the distribution of binders and conductive auxiliary agents in the electrode.

In an embodiment, the distribution of binders and conductive auxiliary agents in the cathode active material layer is changed by mixing the cathode active material with phosphorous acid ($H_3PO_3$) when preparing the cathode mixture slurry, which allows for improving the winding characteristics of an electrode.

According to an embodiment, the gas generation can be inhibited and thus the cycle characteristics can be improved. In addition, the winding characteristics of an electrode can be improved.

According to an embodiment, the winding characteristics of a cathode are improved by changing the distribution of binders and conductive auxiliary agents in the cathode.

Additional features and advantages are described herein, and will be apparent from the following Detailed Description and the figures.

BRIEF DESCRIPTION OF THE FIGURES

FIGS. 9A and 9B are graphs showing results of the cathode electrode in Example 21 and Comparison 1 which are determined based on TOF-SIMS positive secondary ion mass spectrometry;

FIGS. 10A and 10B are graphs showing results of the cathode electrode in Example 21 and Comparison 1 which are determined based on TOF-SIMS positive secondary ion mass spectrometry;

FIG. 11 is graphs showing results of the cathode electrode in Example 21 and Comparison 1 which are determined based on TOF-SIMS negative secondary ion mass spectrometry;

FIG. 21 is graphs showing results of the cathode electrode in Samples 2 and 12 which are determined based on TOF-SIMS negative secondary ion mass spectrometry.

DETAILED DESCRIPTION

The present application will be described with reference to the accompanying drawings according to an embodiment. First, an example of the structure of the nonaqueous electrolyte battery according to the first embodiment will be described with reference to FIGS. 2 and 3.

Figure 1A:
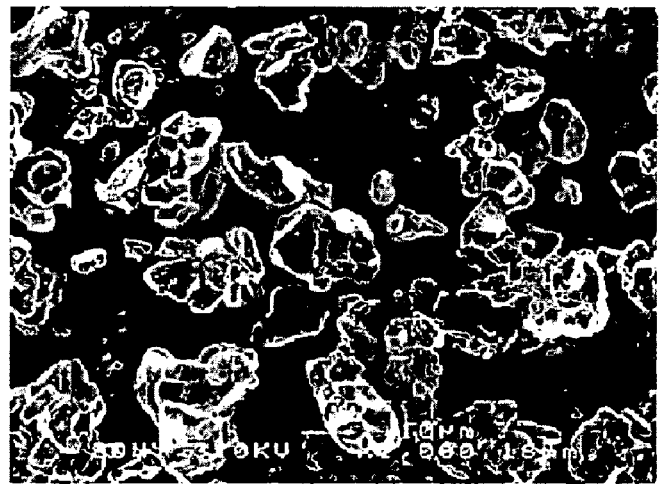
FIGS. 1A and 1B are electron micrographs of an example of $Li_xCoO_2$ and $Li_xNiO_2$.
Figure 1B:
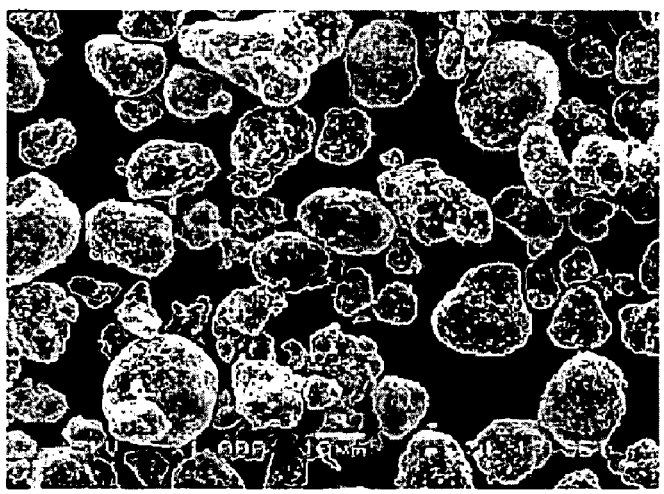
Figure 2:
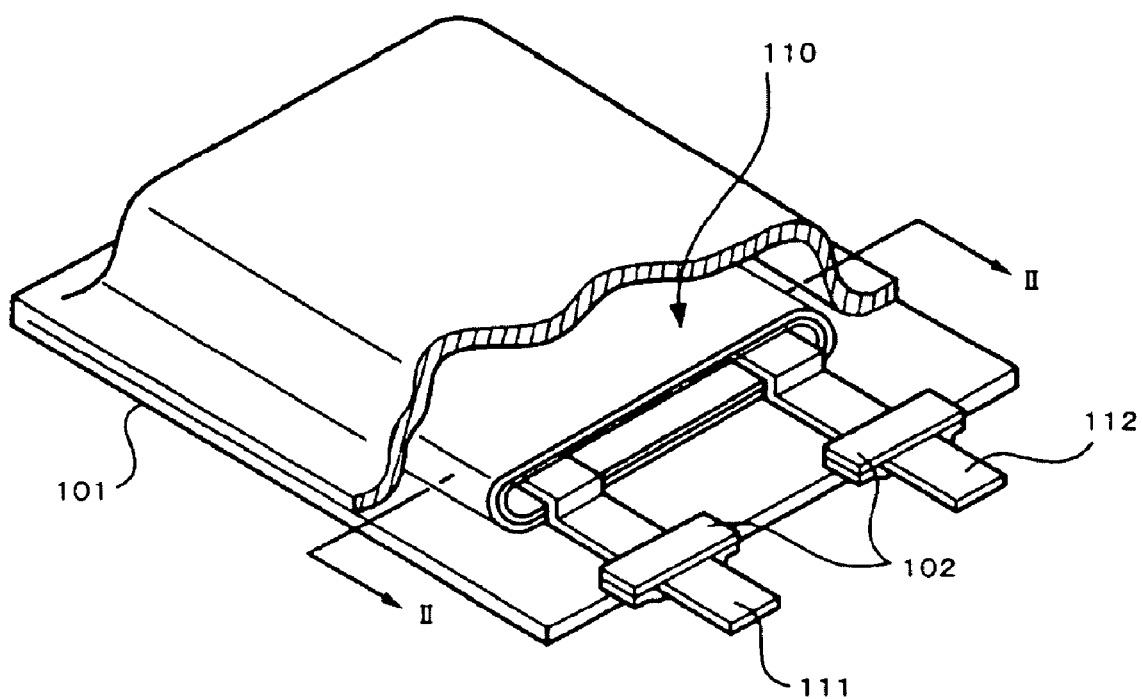
FIG. 2 is a perspective view showing a structural example of the nonaqueous electrolyte battery according to a first embodiment.

FIG. 2 is a perspective view showing a structural example of the nonaqueous electrolyte battery according to the first embodiment. The nonaqueous electrolyte battery is, for example, a nonaqueous electrolyte secondary battery. The nonaqueous electrolyte battery has the spiral electrode body 110 on which the cathode lead 111 and the anode lead 112 are mounted in a film-shaped exterior member 1 and has a flat type.

Each of the cathode lead 111 and the anode lead 112 has a stripe-shaped, and is drawn, respectively from the inside of the exterior member 101 to the outside, for example, in the same direction. The cathode lead 111 is made of metallic materials such as aluminium Al and the anode lead 112 is made of metallic materials such as nickel Ni.

The exterior member 101 is a laminated film having a structure in which, for example, the insulating layer, the metal layer, and the outermost are stacked sequentially in this order and then combined by lamination. In the exterior member 101, for example, the insulating layer is faced inwardly and the respective outer edges are bonded by welding or by using adhesives.

The insulating layer is made of polyethylene, polypropylene, modified polyethylene, modified polypropylene or polyolefin resins such as copolymers thereof. This is because the moisture permeability is decreased and an excellent airtightness is provided. The metal layer is made of aluminium, stainless steel, nickel, or iron in foil-shaped or plate form. The outermost layer may be made of, for example, the same resin as that of the insulating layer and further may be made of nylon. This is because resistance to breakage or sticking can be improved. The exterior member 101 may include other layers in addition to the insulating layer, the metal layer, and the outermost layer.

In order to improve the adhesion of the cathode lead 111 and the anode lead 112 to the inside of the exterior member 101 and prevent outside air from entering, an adherent film 102 is inserted between the exterior member 101 and the cathode lead 111, and between the exterior member 101 and the anode lead 112. The adherent film 102 is made of a material having adhesion to the cathode lead 111 and the anode lead 112. For example, the adherent film is preferably made of polyolefin resins such as polyethylene, polypropylene, modified polyethylene, or modified polypropylene in the case where the cathode lead 111 and the anode lead 112 is made of the metallic materials described above.

Figure 3:
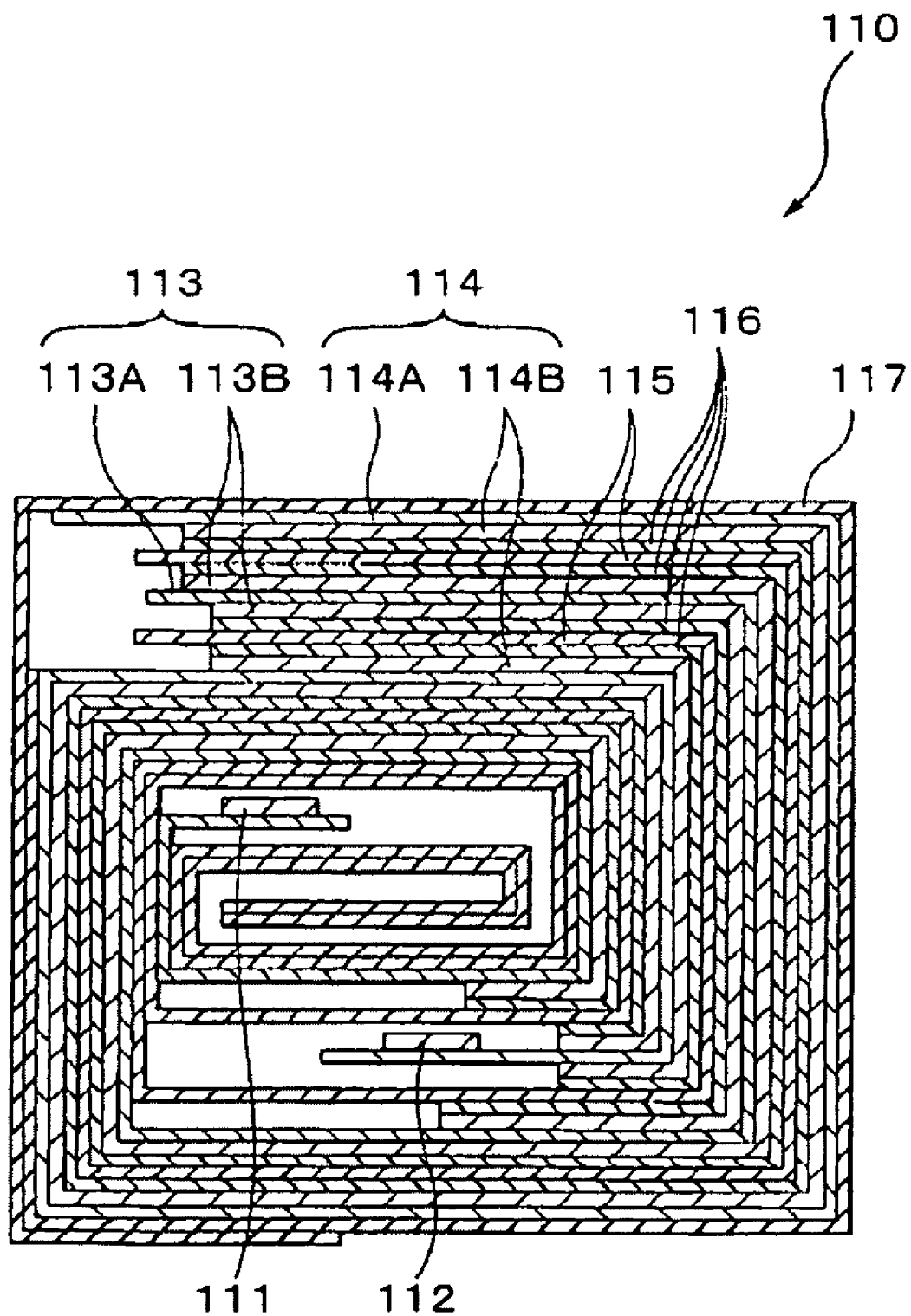
FIG. 3 is a cross-sectional view along the line II-II of a spiral electrode body 110 shown in FIG. 2.

FIG. 3 is a cross-sectional view along the line II-II of the spiral electrode body 110 shown in FIG. 2. The spiral electrode body 110 is formed by stacking a cathode 113 and an anode 114 via a separator 115 and an electrolyte 116 and winding them. The outermost periphery thereof is protected by a protective tape 117.

For example, the cathode 113 has a cathode current collector 113A and a cathode active material layer 113B that is formed on both sides of the cathode current collector 113A. The cathode current collector 113A is made of metal foil such as aluminum foil.

The cathode active material layer 113B contains the cathode active material having a lithium composite oxide which contains the highest proportion of nickel is contained among constituent metal elements except lithium and a phosphorus compound near the surface of the lithium composite oxide. The cathode active material layer 113B further contains a conductive auxiliary agent such as a carbon material and a binder such as polyvinylidene fluoride or polytetrafluoroethylene. In the case where the highest proportion of nickel among constituent metal elements except lithium is contained, the content of constituent metal elements except lithium is equivalent to that of nickel. In the case where this content is highest as compared to the content of constituent metal elements except lithium other than these, the condition falls under the above-described condition.

Specific examples of the lithium composite oxide, which contains the highest proportion of nickel among constituent metal elements except lithium, include lithium composite oxides having an average composition represented by Formula 1:

$Li_xCo_yNi_zM_{1-y-z}O_{b-a}X_a$ (Chemical formula 1)

wherein M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and x, y, z, a, and b are values in the range of $0.8 < x \leq 1.2$, $0 \leq y \leq 0.5$, $0.5 \leq z \leq 1.0$, $1.8 \leq b \leq 2.2$, and $0 \leq a \leq 1.0$, respectively.

A phosphorus compound is a compound in which the binding energy peak in the P 2p spectrum based on X-ray photoelectron spectroscopy is in the range of 132 to 135 eV. At least a part of the phosphorus compound is a phosphorus compound represented by, for example, Formula 2 or 3:

$$Li_cH_dP_eO_f \quad \text{(Chemical formula 2)}$$

wherein c, e, and f represent an integer of 1 or more; and d represents an integer of 0 or more, $$Li_gPO_hF_i \quad \text{(Chemical formula 3)}$$

wherein g, h, and i represent an integer of 1 or more.

These phosphorus compounds are present near the surface of lithium composite oxide particles, for example, it is present so as to cover the lithium compound oxide particles.

As a method for confirming that these phosphorus compounds are present near the surface of lithium composite oxide particles, for example, a method in which the cathode 113 is embedded in resin and then the distribution in the cross section is determined by Time-of-Flight secondary Ion Mass Spectrometry (TOF-SIMS) is listed. Alternatively, it can be confirmed by analyzing elements by X-ray photoelectron spectroscopy while the cathode surface is spattered with argon.

In the case where the cathode active material is analyzed in accordance with the method shown in JIS-R-9101, the concentrations of carbonate and bicarbonate are preferably 0.3 parts by weight or less. When the concentrations of bicarbonate and carbonate exceeds 0.3 parts by weight, bicarbonate and carbonate are decomposed by the charging and discharging operation and the amount of generated gas is increased, which causes battery expansion or deterioration in the cycle characteristics.

The cathode active material layer 113B has a peak of a fragment of at least one secondary ion selected from the group consisting of positive secondary ions of $Li_4PO_4$, $C_3F_5$, $C_5F_9$, $C_7F_{13}$, negative secondary ions of $PO_2$, $PO_3$, $LiP_2O_4$, $LiP_2O_5$, $LiP_2O_6$, $LiPO_2F$, $LiPO_3F$, $POF_2$, $PO_2F_2$, and $LiPO_3H$ based on the surface analysis by TOF-SIMS is observed near the surface.

The cathode active material layer 113B may be formed in the following manner as described in the first and second examples.

In the first example, a cathode active material is kneaded with a binder such as polyvinylidene fluoride (PVdF) and a conductive auxiliary agent such as graphite to produce a cathode mixture slurry. The cathode mixture slurry is applied to the cathode current collector 113A, which is dried and the cathode active material layer 113B is formed.

Here, the cathode active material obtained by mixing lithium composite oxide which contains the highest proportion of nickel among constituent metal elements except lithium with a compound containing at least either $PO_3$ or $PO_4$ and then firing is used.

This cathode active material contains the phosphorus compound which is contained near the surface of the lithium composite oxide. Usable examples of the lithium composite oxide, which contains the highest proportion of nickel among constituent metal elements except lithium, include lithium composite oxides having the average composition represented by Formula 1.

The phosphorus compound contained near the surface of the lithium composite oxide is, for example, a compound in which the binding energy peak in the P 2p spectrum based on X-ray photoelectron spectroscopy is in the range of 132 to 135 eV. At least a part of the phosphorus compound is represented by, for example, Formula 2:

$$Li_cH_dP_eO_f \quad \text{(Chemical formula 2)}$$

wherein c, e, and f represent an integer of 1 or more; and d represents an integer of 0 or more.

Further, the cathode active material has a peak of a fragment of at least one secondary ion selected from the group consisting of a positive secondary ion of $Li_4PO_4$, negative secondary ions of $PO_2$, $PO_3$, $LiP_2O_4$, $LiP_2O_5$, and $LiP_2O_6$ based on the surface analysis by Time-of-Flight secondary Ion Mass Spectrometry (TOF-SIMS).

The cathode active material may be formed, for example, in the following manner. First, for example, oxide containing nickel as an active material precursor or hydroxide, lithium salt, and further a compound containing at least either $PO_3$ or $PO_4$ are mixed and fired.

Here, examples of the compound containing at least either $PO_3$ or $PO_4$ include phosphoric acid compounds such as phosphorous acid ($H_3PO_3$), phosphoric acid ($H_3PO_4$), and phosphoric acid lithium ($Li_3PO_4$). Examples of the oxide containing nickel include compounds represented by Formula 4. Examples of the hydroxide containing nickel include compounds represented by Formula 5:

$$Co_yNi_zM_{1-y-z}O_{j-a}X_a \quad \text{(Chemical formula 4)}$$

$$Co_yNi_zM_{1-y-z}(OH)_{k-a}X_a \quad \text{(Chemical formula 5)}$$

wherein M is one element selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and y, z, a, j, and k are values in the range of $0 \leq y \leq 0.5$, $0.5 \leq z \leq 1.0$, $0.8 \leq j \leq 1.2$, $2 \leq k \leq 4$, and $0 \leq a \leq 0.5$, respectively.

$PO_3$ and $PO_4$ groups, which are contained in the above-mentioned compound, are acidic and effective in neutralizing the alkalinity of LiOH which is an impurity component. Further, the amount of $Li_2CO_3$ to be produced is also decreased by reducing the LiOH component which is easily carbonated. Here, the LiOH can be neutralized also by using nitric acid components and sulfuric acid components. However, these components cause damage to the active material due to their strong acidity and the discharging capacity is decreased, and therefore they are not preferable.

Examples of the lithium salt include lithium salts represented by Formulae 6 and 7.

$$LiOH—H_2O \quad \text{(Chemical formula 6)}$$

$$LiNO_3 \quad \text{(Chemical formula 7)}$$

It is preferable to add oxide, hydroxide, and lithium salt so that the molar ratio of lithium Li, cobalt Co, nickel Ni, and M is equivalent to the ratio represented by Formula 1.

$$0.8 \leq Li/(Co+Ni+M) \leq 1.2 \quad \text{(Formula 1)}$$

At least either phosphorous acid ($H_3PO_3$) or phosphoric acid lithium ($Li_3PO_4$) is added in an amount of 0.1 parts by weight to 5.0 parts by weight based on the total weight of the mixture of lithium salt represented by Formula 6 and the lithium salt represented by Formula 7, which is fired in an air or oxygen atmosphere at 700° C. or higher for 5 hours. As described above, a cathode active material to be used in the first example is obtained.

The cathode active material to be used in the first example may be produced by adding phosphorous acid ($H_3PO_3$) to lithium composite oxide which contains the highest proportion of nickel among constituent metal elements except lithium and refiring. Similarly, an effect that reduces LiOH and $Li_2CO_3$, which are impure components is recognized. It is preferable that the addition amount of phosphorous acid ($H_3PO_3$) at that time is in the range shown in Formula 2. It is preferable that the refiring atmosphere is in an oxygen atmosphere.

$$0.2 \text{ parts by weight} \leq \text{addition amount of } H_3PO_3 \leq 20 \text{ parts by weight} \quad \text{(Formula 2)}$$

In the second example, the lithium composite oxide which contains the highest proportion of nickel among constituent metal elements except lithium is kneaded with a binder such as polyvinylidene fluoride (PVdF) and a solvent such as N-methyl-2-pyrrolidone (NMP), a compound containing at least either $PO_3$ or $PO_4$ is further added to produce a cathode mixture slurry. The cathode mixture slurry is applied to the cathode current collector 113A, which is dried and the cathode active material layer 113B is formed. As described above, conductive auxiliary agents such as graphites may be added at the time of kneading.

Thus, LiOH (i.e., impurity) can be neutralized by adding the compound containing at least either $PO_3$ or $PO_4$ at the time of kneading. In this regard, when phosphorous acid ($H_3PO_3$) is used as the compound containing at least either $PO_3$ or $PO_4$, phosphorous acid ($H_3PO_3$) is added at the ratio shown in Formula 3 at the time of kneading.

$$0.05 \text{ parts by weight} \leq \text{content of } H_3PO_3 \leq 5.0 \text{ parts by weight} \quad \text{(Formula 3)}$$

In related art, as for the cathode active material whose composition contains nickel Ni, LiOH which is formed on the surface of the active material as an impurity is gradually carbonated in the air, and thus it is necessary to handle it carefully in the air. On the other hand, according to the embodiment, the LiOH formed on the surface of the cathode active material is converted to phosphoric acid lithium with a low reactivity by treating with phosphorous acid ($H_3PO_3$), thereby preventing it from absorbing carbon dioxide gas in the air.

Thus, there is provided a nonaqueous electrolyte battery which is stable as a product since expansion and deterioration of cycle characteristics are reduced.

For example, as with the cathode 113, the anode 114 has an anode current collector 114A and an anode active material layer 114B that is formed on both sides of the anode current collector 114A. The anode current collector 114A is made of metal foil such as copper foil.

The anode active material layer 114B include any one, or two or more of the anode material capable of occluding and releasing lithium as an anode active material and may also include conductive auxiliary agents and binders, if necessary.

Examples of the anode material capable of occluding and releasing lithium include carbon materials such as graphite, non-graphitizable carbon, or graphitizable carbon. Any one of the carbon materials may be used alone or two or more of them may be used in combination. Further, two or more of carbon materials with different mean particle diameters may be mixed.

Further, the anode material capable of occluding and releasing lithium is defined as an anode material capable of occluding and releasing lithium and examples thereof include materials which contain a metal element capable of forming lithium and alloy or a metalloid element as a constituting element. Specific examples include the simple substance, alloy, and compound of the metal element capable of forming lithium and alloy; or the simple substance, alloy, and compound of the metalloid element capable of forming lithium and alloy; or materials having the phases of one or more such materials in at least one part thereof.

Examples of the metal element or metalloid element include tin Sn, lead Pb, aluminium, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, or hafnium Hf. Among them, metal elements of Group 14 of the long-period periodic table or metalloid elements are preferable. A particularly preferable example is silicon Si or tin Sn. This is because silicon Si and tin Sn have a large ability to occlude and release lithium and a high energy density can be obtained.

Examples of the alloy of silicon Si include alloys containing at least one among the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than silicon Si. Examples of the alloy of tin Sn include alloys containing at least one among the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than tin Sn.

As a compound of silicon Si or a compound of tin Sn, for example, a compound containing oxygen O or carbon C is listed. In addition to silicon Si or tin Sn, the second constituting element described above may be contained.

Any material may be used for the separator 115 as long it is electrically stable, chemically stable toward the cathode active material, the anode active material, or the solvent and has an electrical conductivity. For example, a nonwoven fabric made of polymer, a porous film, glass, or a paper-shaped sheet made of ceramic fibers can be used and a plurality of them may be stacked for use. Particularly, it is preferable to use a porous polyolefin film. Further, the porous polyolefin film may be combined with polyimide, glass, or heat-resistant materials made of ceramic fibers for use.

The electrolyte 116 contains an electrolytic solution and a support containing a polymeric compound and is a so-called gel layer. The electrolytic solution contains an electrolyte salt and a solvent to dissolve the electrolyte salt. Examples of the electrolyte salt include lithium salts such as $LiPF_6$, $LiClO_4$, $LiBF_4$, $LiN(SO_2CF_3)_2$, and $LiN(SO_2C_2F_5)_2$, and $LiAsF_6$. Any one of the electrolyte salts may be used alone or two or more of them may be used in combination.

Examples of the solvent include lactone-based solvents such as γ-butyrolactone, γ-valerolactone, δ-valerolactone, and ε-caprolactone; carbonate solvents such as ethylene carbonate, propylene carbonate, butylene carbonate, vinylene carbonate, dimethyl carbonate, ethyl methyl carbonate, and diethyl carbonate; ether-based solvents such as 1,2-dimethoxy ethane, 1-ethoxy-2-methoxy ethane, 1,2-diethoxy ethane, tetrahydrofuran, and 2-methyl tetrahydrofuran; nitrile-based solvents such as acetonitriles; sulfolane solvents; phosphoric acids; phosphate solvents; or nonaqueous solvents such as pyrolidones. Any one of the solvents may be used alone or two or more of them may be used in combination.

Further, it is preferable that a compound in which a part or all of hydrogen atoms of a cyclic ester or chain ester is fluorinated is contained as a solvent. Preferable examples of the fluorinated compound to be used herein include difluoro ethylene carbonate (4,5-difluoro-1,3-dioxolane-2-on). Even when the anode 114 that contains compounds such as silicon Si, tin Sn, and germanium Ge as the anode active materials is used, charge-discharge cycle characteristics can be improved.

This is because, particularly, fluoroethylene carbonate has an excellent effect on the improvement in the cycle-characteristics.

Any polymeric compound may be used as long as it can absorb a solvent to turn into a gel. Examples thereof include fluorinated polymeric compounds such as polyvinylidene fluoride and a copolymer of vinylidene fluoride and hexa fluoro propylene; ether-based polymeric compounds such as polyethylene oxide and a crosslinking monomer containing polyethylene oxide; and a compound containing polyacrylonitrile, polypropylene oxide, or polymethylmethacrylate as a repeating unit. Any one of the polymeric compounds may be used alone or two or more of them may be used in combination.

Particularly, from the point of view of the redox stability, fluorinated polymeric compounds are desirable. Among them, a copolymer containing vinylidene fluoride and hexa fluoro propylene as components is preferable. Additionally, the copolymer may contain a monoester of an unsaturated dibasic acid such as monomethyl maleate; halogenated ethylene such as trifluoroethylene; a cyclic ester carbonate of an unsaturated compound such as vinylene carbonate; or an acrylic vinyl monomer containing an epoxy group as a component. This is because higher characteristics can be obtained.

Subsequently, an example of methods for manufacturing the nonaqueous electrolyte battery according to the first embodiment will be described.

First, the cathode active material layer 113B is formed on, for example, the cathode current collector 113A and the cathode 113 is fabricated. The cathode active material layer 113B is formed as described above. Further, the anode active material layer 114B is formed on, for example, the anode current collector 114A and the anode 114 is fabricated. As for the anode active material layer 114B, the anode active material and the binder were mixed to prepare an anode mixture and then the anode mixture was dispersed in a solvent such as N-methyl-2-pyrrolidone (NMP) to provide a paste-shaped anode mixture slurry. Next, the anode mixture slurry was applied to the anode current collector 122A and the solvent was dried, followed by compression molding with a roll presser to form the anode active material layer 122B. Next, the cathode lead 111 is mounted on the cathode current collector 113A and the anode lead 112 is mounted on the anode current collector 114A.

Subsequently, the electrolytic solution and the polymeric compound are mixed using the combined solvent. The resulting mixed solution is applied onto the cathode active material layer 113B and the anode active material layer 114B and then the combined solvent is volatilized to form the electrolyte 116. Then, the cathode 113, separator 115, anode 114, and separator 115 are stacked sequentially in this order and then are wound. The protective tape 117 is adhered to outermost periphery thereof in order to form the spiral electrode body 110. Thereafter, the spiral electrode body 110 is sandwiched between the exterior members 101 and then the outer edges of the exterior members 101 are heat-sealed. During the process, the adherent film 102 is inserted between the cathode lead 111 and the exterior member 101, and between the anode lead 112 and the exterior member 101. Thus, the nonaqueous electrolyte battery shown in FIG. 2 is obtained.

Further, the cathode 113 and the anode 114 are not wound after forming the electrolyte 116 thereon, but the cathode 113 and anode 114 are wound via the separator 115 and sandwiched between the exterior members 101. Then, an electrolyte composition, which contains the electrolytic solution and a monomer of the polymeric compound, may be injected so that the monomer is polymerized in the exterior member 101.

When this nonaqueous electrolyte battery is charged, a lithium ion is released from, for example, the cathode 113 and occluded into the anode 114 via the electrolyte 116. On the other hand, when the nonaqueous electrolyte battery is discharged, a lithium ion is released from, for example, the anode 114 and occluded into the cathode 113 via the electrolyte 116.

As described above, according to the first embodiment, in the lithium composite oxide which contains the highest proportion of nickel among constituent metal elements except lithium, typified by $Li_xNiO_2$, the gas generation can be inhibited by reducing LiOH and $Li_2CO_3$ (i.e., impurities). Thus, the nonaqueous electrolyte battery, which has a high capacity and a high cycle life, can be obtained.

Further, according to the first embodiment, the distribution of the binders and the conductive auxiliary agents in the electrode is changed by treating the cathode active material with the compound containing at least either $PO_3$ or $PO_4$ such as phosphorous acid, thereby improving the winding characteristics of the electrode. Furthermore, since the winding characteristics of the electrode can be improved, the manufacture of the battery having a flat type, as described in the first embodiment, can be achieved.

Further, a gap between the primary particles of the cathode active material are not filled by changing the distribution of the binders and the conductive auxiliary agents in the electrode, thus the capacity for large discharge currents (load characteristics) can be improved.

Subsequently, the second embodiment will be described. With reference to the nonaqueous electrolyte battery according to the second embodiment, an electrolytic solution is used in place of a gel electrolyte 16 in the nonaqueous electrolyte battery according to the first embodiment. In this case, the separator 15 is impregnated with the electrolytic solution. In this regard, the same electrolytic solution as that of the first embodiment can be used.

The nonaqueous electrolyte battery having such a structure may be fabricated, for example, in the following manner. The spiral electrode body 110 is fabricated by winding the cathode 113 and the anode 114 in the same manner as described in the first embodiment except for the gel electrolyte 116 is not formed. The spiral electrode body 110 is sandwiched between the exterior members 101. Then the electrolytic solution is injected and the exterior member 101 is sealed.

In the second embodiment, the same effect as that of the first embodiment can be obtained.

Figure 4:
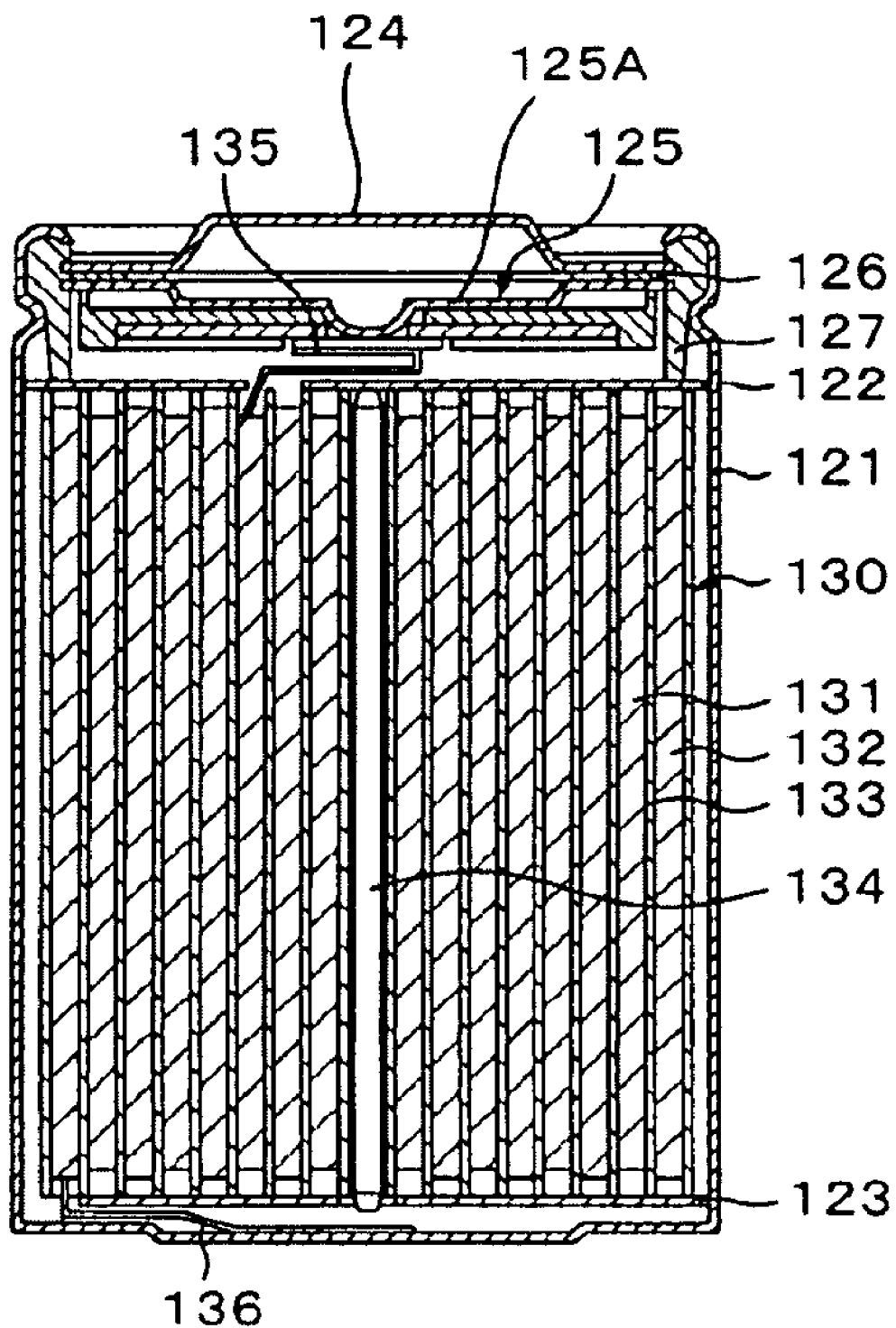
FIG. 4 is a cross-sectional view showing a structural example of the nonaqueous electrolyte battery according to a third embodiment.

Next, the structure of the nonaqueous electrolyte battery according to the third embodiment will be described with reference to FIGS. 4 and 5. FIG. 4 shows a structural example of the nonaqueous electrolyte battery according to a third embodiment. This nonaqueous electrolyte battery is a so-called cylindrical shape and includes a spiral electrode body 130 in which a band-shaped cathode 131 and a band-shaped anode 132 are wound via a separator 133 in a hollow cylinder-shaped battery can 121 which is a cylinder can as an exterior member. The separator 133 is impregnated with an electrolytic solution which is a liquid electrolyte. The battery can 121 is made of iron Fe plated with nickel Ni and one end thereof is closed, and the other end is opened. In the battery can 121, a pair of insulating plates 122 and 123 are arranged to sandwich the spiral electrode body 130 perpendicularly to a periphery surface thereof.

A battery lid 124, and a safety valve mechanism 125 and a positive temperature coefficient (PTC) element 126 which are positioned inside the battery lid 124, are mounted in the open end of the battery can 121 by caulking via a gasket 127 to seal the inside of the battery can 121. The battery lid 124 is made of the same material as that of the battery can 121. The battery lid 124 is made of the same material as the battery can 121. The safety valve mechanism 125 is electrically connected to the battery lid 124 through a heat sensitive resistive element 126. When an internal pressure of the battery becomes more than certain value due to internal short circuit or heating from outside, a disk plate 125A is inverted to cut the electric connection between the battery lid 124 and the spiral electrode body 130. The heat sensitive resistive element 126 restricts electric currents, when its resistance increases with an increase in temperature, to prevent unusual heat generation due to high electric currents. The gasket 127 is made of an insulating material and asphalt is applied to the surface thereof.

The spiral electrode body 130 is wound around, for example, a center pin 134. A cathode lead 135 containing aluminum Al or the like is connected to the cathode 131 of the spiral electrode body 130, and an anode lead 136 containing nickel Ni or the like is connected to the anode 132. The cathode lead 135 is welded to the safety valve mechanism 125 to be electrically connected with the battery lid 124. The anode lead 136 is welded to the battery can 121 to be electrically connected.

Figure 5:
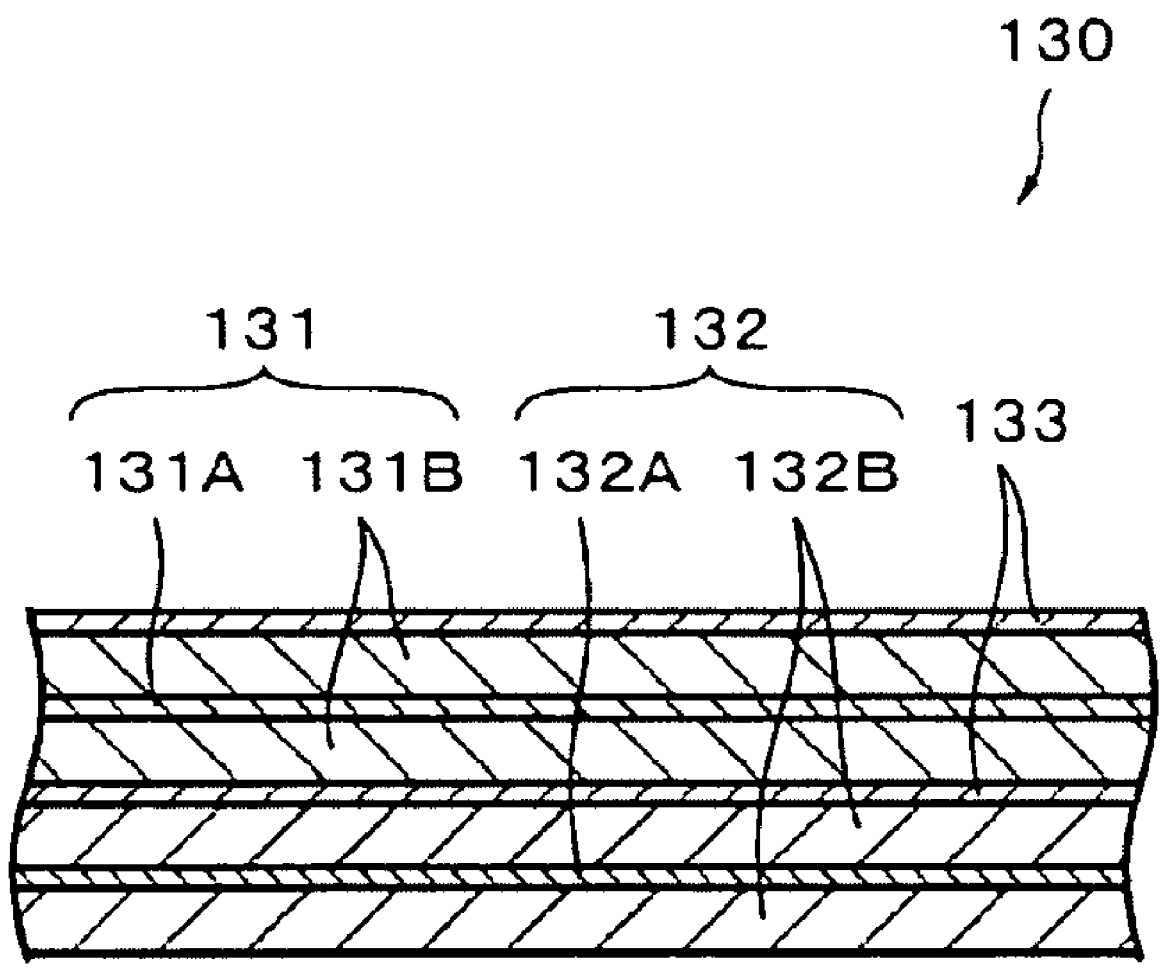
FIG. 5 is a partly enlarged cross-sectional view showing a spiral electrode body 130 shown in FIG. 4.

FIG. 5 is a partly enlarged cross-sectional view showing the spiral electrode body 130 shown in FIG. 4. The spiral electrode body 130 is formed by laminating and winding the cathode 131 and the anode 132 via the separator 133.

For example, the cathode 131 has a cathode current collector 131A and a cathode active material layer 131B that is formed on both sides of the cathode current collector 131A. For example, the anode 132 has an anode current collector 132A and an anode active material layer 132B that is formed on both sides of the anode current collector 132A. Each structure of the cathode current collector 131A, the cathode active material layer 131B, the anode current collector 132A, the anode active material layer 132B, the separator 133, and the electrolytic solution is the same as that of the cathode current collector 113A, the cathode active material layer 113B, the anode current collector 114A, the anode active material layer 114B, the separator 115, and the electrolytic solution in the first embodiment.

Next, an example of the method for manufacturing the nonaqueous electrolyte battery according to the third embodiment will be described.

The cathode 131 is fabricated in the following manner. As described above, the cathode active material layer 131B is formed on the cathode current collector 131A to obtain the cathode 131.

The anode 132 is fabricated in the following manner. First, the anode active material and the binder were mixed to prepare an anode mixture and then the anode mixture was dispersed in a solvent such as N-methyl-2-pyrrolidone to give an anode mixture slurry. Next, the anode mixture slurry was applied to the anode current collector 132A and the solvent was dried, followed by compression molding with a roll presser to form the anode active material layer 132B. Then, the anode 132 was fabricated.

Next, the cathode lead 135 is fixed to the cathode current collector 131A with welding or the like, and the anode lead 136 is fixed to the anode current collector 132A. Thereafter, the cathode 131 and the anode 132 are wound sandwiching the separator 133 therebetween, a tip portion of the cathode lead 135 is welded to the safety valve mechanism 125, a tip portion of the anode lead 136 is welded to the battery can 121, and the wound cathode 131 and anode 132 are sandwiched between a pair of the insulating plates 122 and 123, and then housed inside the battery can 121. After housing the cathode 131 and anode 132 inside the battery can 121, the electrolyte is injected into the battery can 121 to be impregnated into the separator 133. Thereafter, the battery lid 124, the safety valve mechanism 125, and the heat sensitive resistive element 126 are caulked and fixed to an opening end of the battery can 121 through the gasket 127. As described above, the nonaqueous electrolyte battery shown in FIG. 4 is fabricated.

In the third embodiment, the same effect as that of the first embodiment can be obtained. Although the cylinder can is used as the exterior member in the third embodiment, the generation of gas is inhibited. Therefore, breakage due to the increased internal pressure that is produced by the generation of gas can be prevented.

Figure 6:
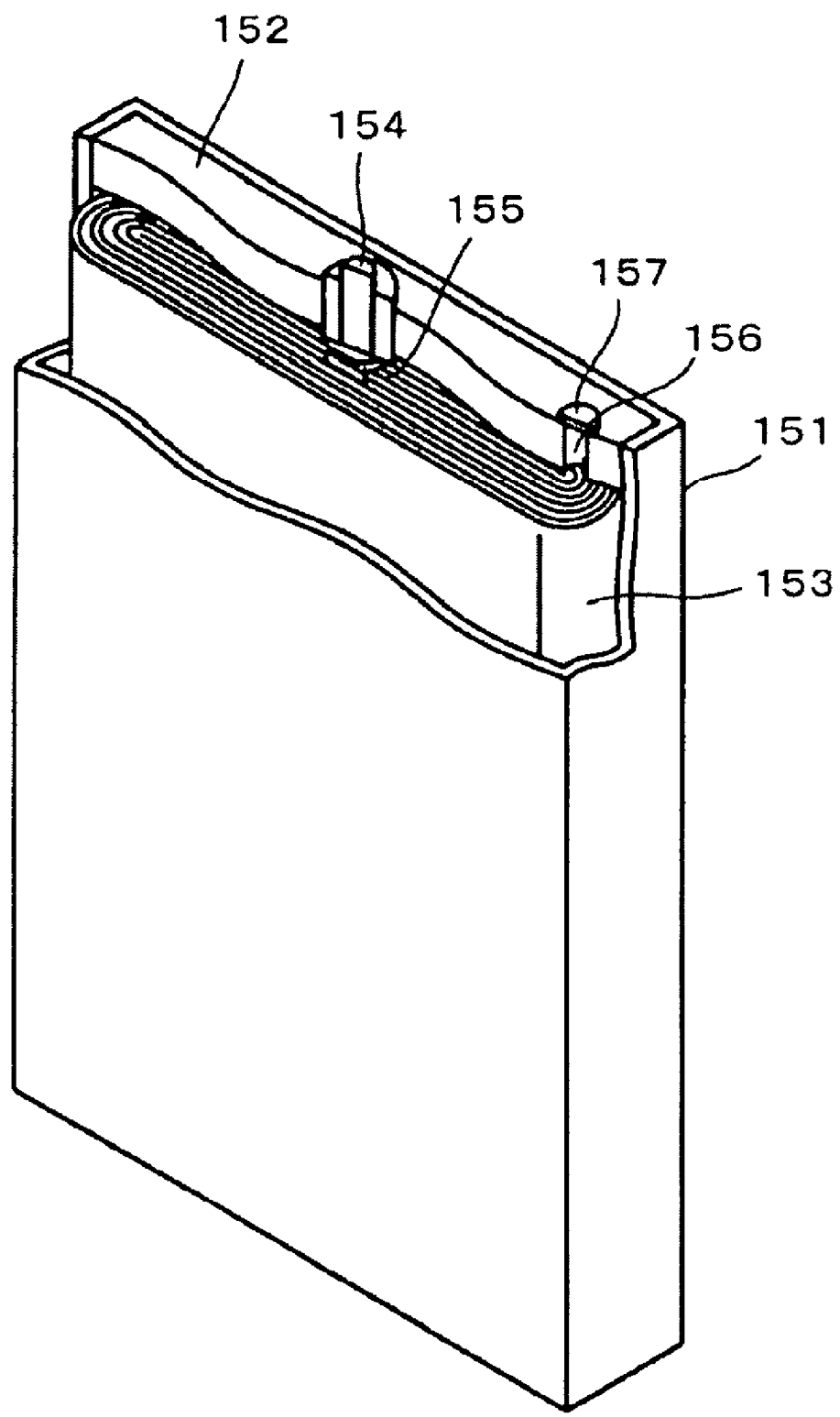
FIG. 6 is a perspective view showing a structural example of the nonaqueous electrolyte battery according to a fourth embodiment.

Next, the nonaqueous electrolyte battery according to the fourth embodiment will be described. The fourth embodiment is the nonaqueous electrolyte battery having a square shape. As shown in FIG. 6, in the fourth embodiment, a spiral electrode body 153 is housed in an exterior can 151 having a square shape which is made of metals such as aluminium Al and iron Fe. Then, an electrode pin 154 provided on a battery lid 152 is connected with an electrode terminal 155 drawn from the spiral electrode body 153 and the exterior can is closed by the battery lid 152. The electrolytic solution is injected from an electrolytic solution inlet 156, then the inlet is sealed by a sealing member 157 and the nonaqueous electrolyte battery is fabricated. In this regard, the spiral electrode body 153 is the same as the first embodiment, a detailed description will not be repeated here.

In the fourth embodiment, the same effect as that of the first embodiment can be obtained. Although the exterior can 151 having a square shape can be used as the exterior member in the fourth embodiment, the generation of gas is inhibited. Therefore, breakage due to the increased internal pressure that is produced by the generation of gas can be prevented.

EXAMPLES

Example 1

Composite hydroxide particles having an average composition of $Co_{0.20}Ni_{0.77}Al_{0.03}(OH)_2$ and a mean particle diameter of 12 μm which was determined by the laser scattering method was mixed with commercially available lithium hydroxide $LiOH-H_2O$ at a molar ratio of $Li/(Co+Ni+M)=0.98$, (where and M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb).

The commercially available phosphorous acid ($H_3PO_3$) was added in an amount of 0.5 parts by weight based on the total weight of the mixed powder, which was mixed vigorously. The resulting product was placed in an electric furnace and heated up to 470° C. in an oxygen atmosphere (at a rate of 2° C./min), followed by leaving for four hours. Further, the obtained product was heated up to 790° C. (at a rate of 2° C./min), which was left for 6 hours and then cooled to room temperature to produce a cathode active material fired powder. The fired powders were ground so that it can pass through a mesh with an opening of 50 μm. 2 parts by weight of polyvinylidene fluoride (PVdF) and 1 parts by weight of graphite were added to 97 parts by weight of composite hydroxide particles. Then, N-methyl-2-pyrrolidone (NMP) was added thereto and well kneaded for 1 hour. Thereafter, the obtained mixture was thinly applied onto Al foil, which was dried and then cut into the predetermined size, and the cathode electrode in Example 1 was obtained.

Example 2

The cathode electrode in Example 2 was obtained in the same manner as described in Example 1 except that composite hydroxide particles having an average composition of $Co_{0.15}Ni_{0.80}Al_{0.05}(OH)_2$ was used.

Example 3

The cathode electrode in Example 3 was obtained in the same manner as described in Example 3 except that composite hydroxide particles having an average composition of $Co_{0.15}Ni_{0.80}Mn_{0.05}(OH)_2$ was used.

Example 4

The cathode electrode in Example 4 was obtained in the same manner as described in Example 4 except that composite hydroxide particles having an average composition of $Co_{0.15}Ni_{0.80}Al_{0.04}Ba_{0.01}(OH)_2$ was used.

Example 5

The cathode electrode in Example 5 was obtained in the same manner as described in Example 5 except that composite hydroxide particles having an average composition of $Co_{0.15}Ni_{0.80}Al_{0.04}Sn_{0.01}(OH)_2$ was used.

Example 6

The cathode electrode in Example 6 was obtained in the same manner as described in Example 1 except that composite hydroxide particles having an average composition of $Co_{0.20}Ni_{0.80}(OH)_2$ was used.

Example 7

The cathode electrode in Example 8 was obtained in the same manner as described in Example 1 except that commercially available $Li_3PO_4$ was added in place of $H_3PO_3$.

Example 8

The cathode electrode in Example 8 was obtained in the same manner as described in Example 7 except that composite hydroxide particles having an average composition of $Co_{0.15}Ni_{0.80}Al_{0.05}(OH)_2$ was used.

Example 9

The cathode electrode in Example 9 was obtained in the same manner as described in Example 7 except that composite hydroxide particles having an average composition of $Co_{0.15}Ni_{0.80}Mn_{0.05}(OH)_2$ was used.

Example 10

The cathode electrode in Example 10 was obtained in the same manner as described in Example 7 except that composite hydroxide particles having an average composition of $Co_{0.15}Ni_{0.80}Al_{0.04}Ba_{0.01}(OH)_2$ was used.

Example 11

The cathode electrode in Example 11 was obtained in the same manner as described in Example 7 except that composite hydroxide particles having an average composition of $Co_{0.15}Ni_{0.80}Al_{0.04}Sn_{0.01}(OH)_2$ was used.

Example 12

The cathode electrode in Example 12 was obtained in the same manner as described in Example 7 except that composite hydroxide particles having an average composition of $Co_{0.20}Ni_{0.80}(OH)_2$ was used.

Example 13

2 parts by weight of polyvinylidene fluoride (PVdF) and 1 parts by weight of graphite were added to 96.8 parts by weight of composite oxide particles having an average composition of $Li_{0.98}Co_{0.20}Ni_{0.77}Al_{0.03}O_{2.1}$ and a mean particle diameter of 12 μm which was determined by the laser scattering method. While the resulting mixture was kneaded with N-methyl-2-pyrrolidone (NMP) for 1 hour. Thereafter, the obtained mixture was thinly applied onto Al foil, which was dried and then cut into the predetermined size, and the cathode electrode in Example 13 was obtained.

Example 14

The cathode electrode in Example 14 was obtained in the same manner as described in Example 13 except that composite oxide particles having an average composition of $Li_{0.98}Co_{0.15}Ni_{0.80}Al_{0.05}O_{2.1}$ and a mean particle diameter of 12 μm which was determined by the laser scattering method was used.

Example 15

The cathode electrode in Example 15 was obtained in the same manner as described in Example 13 except that composite oxide particles having an average composition of $Li_{0.98}Co_{0.15}Ni_{0.80}Mn_{0.05}O_{2.1}$ and a mean particle diameter of 12 μm which was determined by the laser scattering method was used.

Example 16

The cathode electrode in Example 16 was obtained in the same manner as described in Example 13 except that composite oxide particles having an average composition of $Li_{0.98}Co_{0.15}Ni_{0.80}Al_{0.04}Ba_{0.01}O_{2.1}$ and a mean particle diameter of 12 μm which was determined by the laser scattering method was used.

Example 17

The cathode electrode in Example 17 was obtained in the same manner as described in Example 13 except that composite oxide particles having an average composition of $Li_{0.98}Co_{0.15}Ni_{0.80}Al_{0.04}Sn_{0.01}O_{2.1}$ and a mean particle diameter of 12 μm which was determined by the laser scattering method was used.

Example 18

The cathode electrode in Example 18 was obtained in the same manner as described in Example 13 except that composite oxide particles having an average composition of $Li_{0.98}Co_{0.20}Ni_{0.80}O_{2.1}$ and a mean particle diameter of 12 μm which was determined by the laser scattering method was used.

Example 19

The cathode electrode in Example 19 was obtained in the same manner as described in Example 13 except that composite oxide particles having an average composition of $Li_{0.98}Co_{0.28}Ni_{0.70}Al_{0.02}O_{2.1}$ and a mean particle diameter of 12 μm which was determined by the laser scattering method was used.

Example 20

The cathode electrode in Example 20 was obtained in the same manner as described in Example 13 except that composite oxide particles having an average composition of $Li_{0.98}Co_{0.40}Ni_{0.60}O_{2.1}$ and a mean particle diameter of 12 μm which was determined by the laser scattering method was used.

Example 21

2 parts by weight of polyvinylidene fluoride (PVdF) and 1 parts by weight of graphite were added to 96.0 parts by weight of composite oxide particles having an average composition of $Li_{0.98}Co_{0.20}Ni_{0.77}Al_{0.03}O_{2.1}$ and a mean particle diameter of 12 μm which was determined by the laser scattering method. While the resulting mixture was kneaded with N-methyl-2-pyrrolidone (NMP), 1.0 parts by weight of $H_3PO_3$ was further added thereto, which was well kneaded for 1 hour. Thereafter, the obtained mixture was thinly applied onto Al foil, which was dried and then cut into the predetermined size, and the cathode electrode in Example 21 was obtained.

Example 22

The cathode electrode in Example 22 was obtained in the same manner as described in Example 21 except that composite oxide particles having an average composition of $Li_{0.98}Co_{0.15}Ni_{0.80}Al_{0.05}O_{2.1}$ and a mean particle diameter of 12 μm which was determined by the laser scattering method was used.

Example 23

The cathode electrode in Example 23 was obtained in the same manner as described in Example 21 except that composite oxide particles having an average composition of $Li_{0.98}Co_{0.15}Ni_{0.80}Mn_{0.05}O_{2.1}$ and a mean particle diameter of 12 μm which was determined by the laser scattering method was used.

Example 24

The cathode electrode in Example 24 was obtained in the same manner as described in Example 21 except that composite oxide particles having an average composition of $Li_{0.98}Co_{0.15}Ni_{0.80}Al_{0.04}Ba_{0.01}O_{2.1}$ and a mean particle diameter of 12 μm which was determined by the laser scattering method was used.

Example 25

The cathode electrode in Example 25 was obtained in the same manner as described in Example 21 except that composite oxide particles having an average composition of $Li_{0.98}Co_{0.15}Ni_{0.80}Al_{0.04}Sn_{0.01}O_{2.1}$ and a mean particle diameter of 12 μm which was determined by the laser scattering method was used.

Example 26

The cathode electrode in Example 26 was obtained in the same manner as described in Example 21 except that composite oxide particles having an average composition of $Li_{0.98}Co_{0.20}Ni_{0.80}O_{2.1}$ and a mean particle diameter of 12 μm which was determined by the laser scattering method was used.

Example 27

The cathode electrode in Example 27 was obtained in the same manner as described in Example 21 except that composite oxide particles having an average composition of $Li_{0.98}Co_{0.28}Ni_{0.70}Al_{0.02}O_{2.1}$ and a mean particle diameter of 12 μm which was determined by the laser scattering method was used.

Example 28

The cathode electrode in Example 28 was obtained in the same manner as described in Example 21 except that composite oxide particles having an average composition of $Li_{0.98}Co_{0.40}Ni_{0.60}O_{2.1}$ and a mean particle diameter of 12 μm which was determined by the laser scattering method was used.

Comparison 1

2 parts by weight of polyvinylidene fluoride (PVdF) and 1 parts by weight of graphite were added to 97 parts by weight of composite oxide particles having an average composition of $Li_{0.98}Co_{0.20}Ni_{0.77}Al_{0.03}O_{2.1}$ and a mean particle diameter of 12 μm which was determined by the laser scattering method. While the resulting mixture was kneaded with N-methyl-2-pyrrolidone (NMP), 0.2 parts by weight of $H_3PO_3$ was further added thereto, which was well kneaded for 1 hour. Thereafter, the obtained mixture was thinly applied onto Al foil, which was dried and then cut into the predetermined size, and the cathode electrode in Comparison 1 was obtained.

Comparison 2

The cathode electrode in Comparison 2 was obtained in the same manner as described in Comparison 1 except that composite oxide particles having an average composition of $Li_{0.98}Co_{0.15}Ni_{0.80}Al_{0.05}O_{2.1}$ and a mean particle diameter of 12 μm which was determined by the laser scattering method was used.

Comparison 3

The cathode electrode in Comparison 3 was obtained in the same manner as described in Comparison 1 except that composite oxide particles having an average composition of $Li_{0.98}Co_{0.15}Ni_{0.80}Mn_{0.05}O_{2.1}$ and a mean particle diameter of 12 μm which was determined by the laser scattering method was used.

Comparison 4

The cathode electrode in Comparison 4 was obtained in the same manner as described in Comparison 1 except that composite oxide particles having an average composition of $Li_{0.98}Co_{0.15}Ni_{0.80}Al_{0.04}Ba_{0.01}O_{2.1}$ and a mean particle diameter of 12 μm which was determined by the laser scattering method was used.

Comparison 5

The cathode electrode in Comparison 5 was obtained in the same manner as described in Comparison 1 except that composite oxide particles having an average composition of $Li_{0.98}Co_{0.15}Ni_{0.80}Al_{0.04}Sn_{0.01}O_{2.1}$ and a mean particle diameter of 12 μm which was determined by the laser scattering method was used.

Comparison 6

The cathode electrode in Comparison 6 was obtained in the same manner as described in Comparison 1 except that composite oxide particles having an average composition of $Li_{0.98}Co_{0.20}Ni_{0.80}O_{2.1}$ and a mean particle diameter of 12 μm which was determined by the laser scattering method was used.

Comparison 7

2% of polyvinylidene fluoride (PVdF) and 1% of graphite were added to composite oxide particles having an average composition of $Li_{1.01}Co_{0.99}Al_{0.01}O_{2.1}$ and a mean particle diameter of 11 μm which was determined by the laser scattering method. The resulting mixture was well kneaded with N-methyl-2-pyrrolidone (NMP) for 1 hour. Thereafter, the obtained mixture was thinly applied onto Al foil, which was dried and then cut into the predetermined size, and the cathode electrode in Comparison 7 was obtained.

Comparison 8

2 parts by weight of polyvinylidene fluoride (PVdF) and 1 parts by weight of graphite were added to 96.8 parts by weight of composite oxide particles having an average composition of $Li_{1.01}Co_{0.99}Al_{0.01}O_{2.1}$ and a mean particle diameter of 12 μm which was determined by the laser scattering method. While the resulting mixture was kneaded with N-methyl-2-pyrrolidone (NMP) and further 0.2 parts by weight of $H_3PO_3$ was added thereto, which was well kneaded for 1 hour. Thereafter, the obtained mixture was thinly applied onto Al foil, which was dried and then cut into the predetermined size, and the cathode electrode in Comparison 8 was obtained.

A laminated cell (a size of 542436 and a rating of 1000 mAh) was fabricated by using the cathode electrodes in Examples 1 to 28 and Comparisons 1 to 8 and laminating an outer face with aluminum. Further, a laminated cell (a size of 542436 and a rating of 920 mAh) was fabricated by using the cathode electrodes in Comparisons 7 and 8 and laminating an outer face with aluminum. In this regard, the used electrolytic solution had a composition in which LiPF was dissolved in a mixed solvent prepared by mixing ethylene carbonate (EC) and diethyl carbonate (DEC) at a weight ratio of EC:DEC=3:7 so as to be $LiPF_6$ 1 mol/kg and further 5 parts by weight of vinylene carbonate (VC) was added thereto.

Next, the laminated cell thus fabricated was subjected to the following expansion test as well as charge and discharge test and the amount of expansion and the capacity maintenance rate after 500 cycles were determined.

(Expansion Test)

The laminated cell was subjected to two cycles of charge and discharge at 23° C. Then, it was charged to 4.2 V at 23° C. and the thickness (initial thickness) of the battery was measured. Thereafter, the storage test was carried out in a thermostat at 90° C. After 4 hours, the thickness of the battery was determined and then difference between the thickness and the initial thickness was found. In this regard, the charging was performed at a constant current of 0.5 C under a constant voltage condition (up to the upper limit voltage of 4.2 V) and the discharging was performed at a constant current of 0.2 C (up to the final voltage of 2.5 V).

(Charge and Discharge Test)

The capacity maintenance rate was determined by the ratio of the discharge capacity of the 500th cycle at 23° C. to the discharge capacity of the 1st cycle at 23° C., namely, ("discharge capacity of the 500th cycle at 23° C."/"discharge capacity of the 1st cycle at 23° C.")×100. In this regard, the charging was performed at a constant current of 1 C under a constant voltage condition (up to the upper limit voltage of 4.2 V) and the discharging was performed at a constant current of 1 C (up to the final voltage of 2.5 V).

Further, as for the cathode electrode in Example and Comparison, the concentration analysis of the carbonic acid content of the cathode active material was performed in accordance with the method shown in JIS-R-9101.

The measured results and the concentration analysis results of carbonic acid content are shown in Table 1.

TABLE 1

| | COMPOSITION OF CATHODE ACTIVE MATERIAL (MOLAR RATIO) | | | | | | | ADDITION AMOUNT [wt %] | AMOUNT OF EXPANSION [mm] | CAPACITY MAINTENANCE RATE AFTER 500 CYCLES [%] | CARBONIC ACID CONTENT $CO_3^{2-}$ [wt %] |
|---|---|---|---|---|---|---|---|---|---|---|---|
| | Ni | Co | Al | Mn | Ba | Sn | ADDITIVE | | | | |
| EXAMPLE 1 | 77 | 20 | 3 | — | — | — | $H_3PO_3$ | 0.5 | 0.7 | 77.0 | 0.17 |
| EXAMPLE 2 | 80 | 15 | 5 | — | — | — | $H_3PO_3$ | 0.5 | 0.5 | 75.0 | 0.18 |
| EXAMPLE 3 | 80 | 15 | — | 5 | — | — | $H_3PO_3$ | 0.5 | 0.5 | 75.0 | 0.18 |
| EXAMPLE 4 | 80 | 15 | 4 | — | 1 | — | $H_3PO_3$ | 0.5 | 0.5 | 75.2 | 0.18 |
| EXAMPLE 5 | 80 | 15 | 4 | — | — | 1 | $H_3PO_3$ | 0.5 | 0.5 | 75.3 | 0.18 |
| EXAMPLE 6 | 80 | 20 | — | — | — | — | $H_3PO_3$ | 0.5 | 0.8 | 74.0 | 0.13 |
| EXAMPLE 7 | 77 | 20 | 3 | — | — | — | $Li_3PO_4$ | 0.5 | 1.2 | 76.0 | 0.21 |
| EXAMPLE 8 | 80 | 15 | 5 | — | — | — | $Li_3PO_4$ | 0.5 | 1.0 | 74.6 | 0.20 |
| EXAMPLE 9 | 80 | 15 | — | 5 | — | — | $Li_3PO_4$ | 0.5 | 1.0 | 73.1 | 0.20 |
| EXAMPLE 10 | 80 | 15 | 4 | — | 1 | — | $Li_3PO_4$ | 0.5 | 1.0 | 73.0 | 0.20 |
| EXAMPLE 11 | 80 | 15 | 4 | — | — | 1 | $Li_3PO_4$ | 0.5 | 1.0 | 73.8 | 0.20 |
| EXAMPLE 12 | 80 | 20 | — | — | — | — | $Li_3PO_4$ | 0.5 | 1.1 | 72.0 | 0.21 |
| EXAMPLE 13 | 77 | 20 | 3 | — | — | — | $H_3PO_3$ | 0.2 | 0.8 | 82.0 | 0.19 |
| EXAMPLE 14 | 80 | 15 | 5 | — | — | — | $H_3PO_3$ | 0.2 | 0.9 | 81.0 | 0.19 |

TABLE 1-continued

| | COMPOSITION OF CATHODE ACTIVE MATERIAL (MOLAR RATIO) | | | | | | ADDITIVE | ADDITION AMOUNT [wt %] | AMOUNT OF EXPANSION [mm] | CAPACITY MAINTENANCE RATE AFTER 500 CYCLES [%] | CARBONIC ACID CONTENT $CO_3^{2-}$ [wt %] |
|---|---|---|---|---|---|---|---|---|---|---|---|
| | Ni | Co | Al | Mn | Ba | Sn | | | | | |
| EXAMPLE 15 | 80 | 15 | — | 5 | — | — | $H_3PO_3$ | 0.2 | 0.9 | 81.5 | 0.19 |
| EXAMPLE 16 | 80 | 15 | 4 | — | 1 | — | $H_3PO_3$ | 0.2 | 0.9 | 81.2 | 0.19 |
| EXAMPLE 17 | 80 | 15 | 4 | — | — | 1 | $H_3PO_3$ | 0.2 | 0.9 | 81.0 | 0.19 |
| EXAMPLE 18 | 80 | 20 | — | — | — | — | $H_3PO_3$ | 0.2 | 1.0 | 80.0 | 0.20 |
| EXAMPLE 19 | 70 | 28 | 2 | — | — | — | $H_3PO_3$ | 0.2 | 0.8 | 79.4 | 0.18 |
| EXAMPLE 20 | 60 | 40 | — | — | — | — | $H_3PO_3$ | 0.2 | 0.7 | 79.2 | 0.17 |
| EXAMPLE 21 | 77 | 20 | 3 | — | — | — | $H_3PO_3$ | 1.0 | 0.5 | 74.0 | 0.14 |
| EXAMPLE 22 | 80 | 15 | 5 | — | — | — | $H_3PO_3$ | 1.0 | 0.5 | 73.4 | 0.14 |
| EXAMPLE 23 | 80 | 15 | — | 5 | — | — | $H_3PO_3$ | 1.0 | 0.5 | 73.1 | 0.14 |
| EXAMPLE 24 | 80 | 15 | 4 | — | 1 | — | $H_3PO_3$ | 1.0 | 0.5 | 73.0 | 0.14 |
| EXAMPLE 25 | 80 | 15 | 4 | — | — | 1 | $H_3PO_3$ | 1.0 | 0.5 | 73.7 | 0.14 |
| EXAMPLE 26 | 80 | 20 | — | — | — | — | $H_3PO_3$ | 1.0 | 0.6 | 72.5 | 0.16 |
| EXAMPLE 27 | 70 | 28 | 2 | — | — | — | $H_3PO_3$ | 1.0 | 0.5 | 73.2 | 0.14 |
| EXAMPLE 28 | 60 | 40 | — | — | — | — | $H_3PO_3$ | 1.0 | 0.4 | 74.3 | 0.13 |
| COMPARISON 1 | 77 | 20 | 3 | — | — | — | NONE | — | 5.0 | 21.0 | 0.40 |
| COMPARISON 2 | 80 | 15 | 5 | — | — | — | NONE | — | 6.4 | 14.0 | 0.60 |
| COMPARISON 3 | 80 | 15 | — | 5 | — | — | NONE | — | 6.0 | 10 OR LESS | 0.41 |
| COMPARISON 4 | 80 | 15 | 4 | — | 1 | — | NONE | — | 6.0 | 10 OR LESS | 0.42 |
| COMPARISON 5 | 80 | 15 | 4 | — | — | 1 | NONE | — | 6.0 | 10 OR LESS | 0.42 |
| COMPARISON 6 | 80 | 20 | — | — | — | — | NONE | — | 7.6 | 10 OR LESS | 0.45 |
| COMPARISON 7 | — | 99 | 1 | — | — | — | NONE | — | 0.7 | 77.0 | 0.07 |
| COMPARISON 8 | — | 99 | 1 | — | — | — | $H_3PO_3$ | 0.2 | 0.7 | 73.2 | 0.07 |

As shown in Table 1, in the case of Examples 1 to 28 as compared to the case of Comparisons 1 to 6, it was found that the amount of expansion could be remarkably reduced and further the capacity maintenance rate could be significantly improved.

When Comparison 7 was compared to Comparison 8, it was found that, as for the cathode active material not containing nickel, the amount of expansion and the capacity maintenance rate in the case of a battery which was fabricated by using the cathode formed by adding phosphorus compound as an additive are nearly equal to those in the case of a battery which was fabricated by using the cathode formed without adding phosphorus compound as an additive.

Further, the cathode mixture slurry used was the same as that in Examples 6, 12, 18, 24, and Comparison 6. The bending test was performed in order to examine the winding characteristics of the electrode in the case where the amount and type of additive agent is changed. The bending test was performed in the following manner. Polyvinylidene fluoride (PVdF) as a binder, ketjen black as a conductive auxiliary agent, and N-methyl-2-pyrrolidone (NMP) were added to the synthesized cathode active material, which was kneaded and then applied to both sides of aluminum foil 15 μm thick, followed by drying sufficiently in order to volatilize N-methyl-2-pyrrolidone (NMP). After drying, the cathode active material was pressed so as to be a predetermined volume density. Further, the coated foil (electrode) after pressing was subjected to vacuum drying. Thereafter, the foil was bent in half and the occurrence of breakage, cracking, or cutting was visually confirmed. Test results are shown in Table 2. In Table 2, the evaluation of breakage or cracking of a coated foil (electrode) is indicated by a "○" mark or a "x" mark.

TABLE 2

| | COMPOSITION OF CATHODE ACTIVE MATERIAL (MOLAR RATIO) | | ADDITIVE | ADDITION AMOUNT [wt %] | THICKNESS OF ELECTRODE [μm] | VOLUME DENSITY [g/cm³] | | |
|---|---|---|---|---|---|---|---|---|
| | Ni | Co | | | | 3.20-3.25 | 3.30-3.35 | 3.40-3.45 |
| EXAMPLE 6 | 80 | 20 | $H_3PO_3$ | 0.5 | 146 | ooo | ooo | ooo |
| EXAMPLE 12 | 80 | 20 | $Li_3PO_4$ | 0.5 | 145 | ooo | ooo | ooo |
| EXAMPLE 18 | 80 | 20 | $H_3PO_3$ | 0.2 | 147 | ooo | ooo | ooo |
| EXAMPLE 24 | 80 | 20 | $H_3PO_3$ | 1.0 | 146 | ooo | ooo | ooo |
| COMPARISON 6 | 80 | 20 | NONE | — | 145 | ooo | xxx | xxx |

\* o: CUTTING OR CRACKING OF ELECTRODES ARE NOT OBSERVED
x: CUTTING OR CRACKING OF ELECTRODES ARE OBSERVED

As shown in Table 2, in the cathodes of Examples 6, 12, 18, and 24, cutting or cracking of the electrodes was not occurred even when the volume density is in a range of 3.30 g/cm³ to 3.35 g/cm³ or in a range of 3.40 g/cm³ to 3.45 g/cm³. On the other hand, cutting or cracking of the electrodes was occurred in Comparison 6.

Figure 7A:
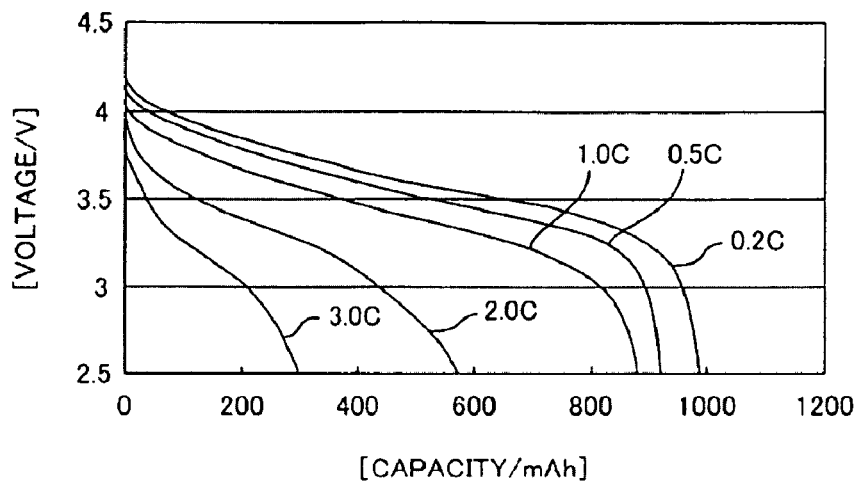
FIGS. 7A and 7B are graphs showing load characteristics of a laminated cell formed by using the cathode electrode in Example 13 and Comparison 1.
Figure 7B:
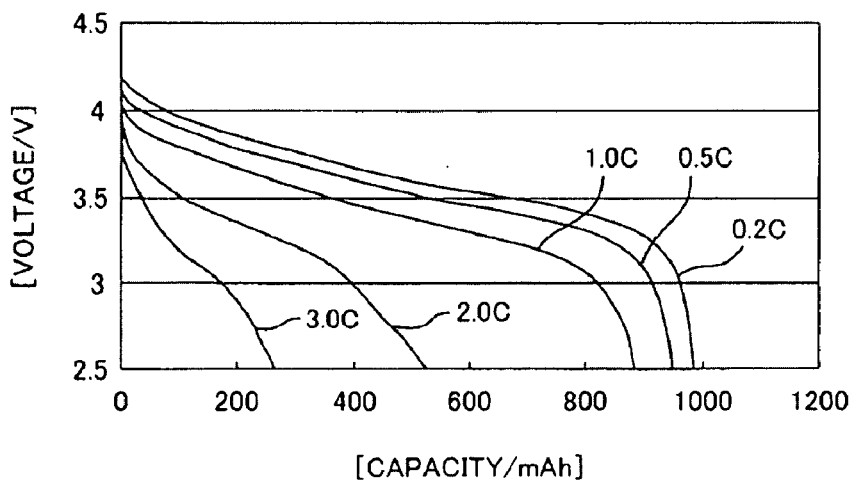

Further, the load characteristics were measured using the laminated cell produced by using the cathode electrode in Example 13 and Comparison 1. The measured results are shown in FIGS. 7A and 7B. FIG. 7A shows the measured results of the laminated cell produced by using the cathode electrode in Example 13. FIG. 7B shows the measured results of the laminated cell produced by using the cathode electrode in Comparison 1. In this regard, the measurement was carried out in a temperature environment of 23° C., the charging was performed at a constant current of 0.2 C under a constant voltage condition (up to the upper limit voltage of 4.2 V), and the discharging was performed at constant currents of 0.2 C, 0.5 C, 1.0 C, 2.0 C, and 3.0 C (up to the final voltage of 2.5 V).

As shown in FIGS. 7A and 7B, it was found that the capacity for large discharge currents in the laminated cell produced using the cathode in Example 13 could be highly improved as compared to that of the laminated cell produced using the cathode in Comparison 1.

Figure 8A:
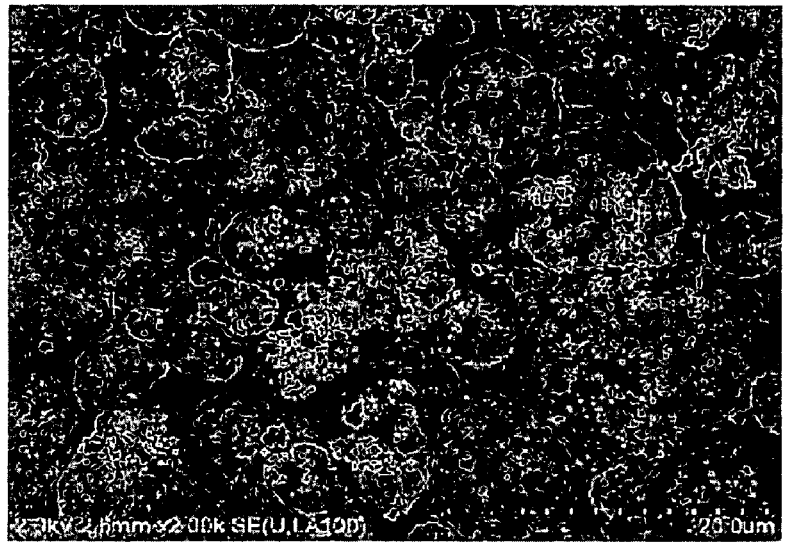
FIGS. 8A and 8B are electron micrographs of the surface of the cathode electrode in Example 13 and Comparison 1.
Figure 8B:
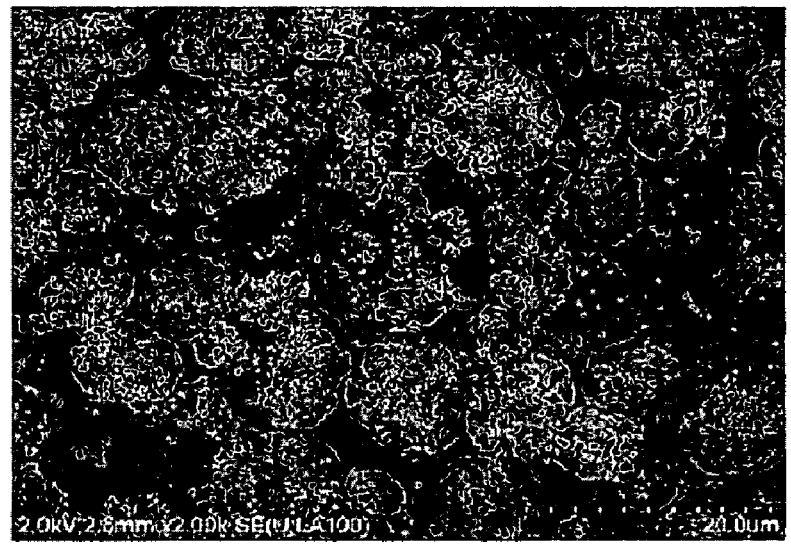

Further, the cathode electrode was observed with an electron microscope. Electron micrographs of the surface of the cathode electrode in Example 13 and Comparison 1 is shown in FIGS. 8A and 8B. FIG. 8A is an electron micrograph of the surface of the cathode electrode in Example 13. FIG. 8B is an electron micrograph of the surface of the cathode electrode in Comparison 1. On the surface of Comparison 1, the binder and the conductive auxiliary agent (black colored area) are incorporated into a gap between the primary particles of the cathode active material (gray area) and a net shape is formed. On the other hand, in Example 13, the binder and the conductive auxiliary agent are hardly incorporated into a gap between the primary particles. It is considered that lower amounts of the binder and the conductive auxiliary agent between primary particles allow lithium ions to move easily.

Figure 9B:
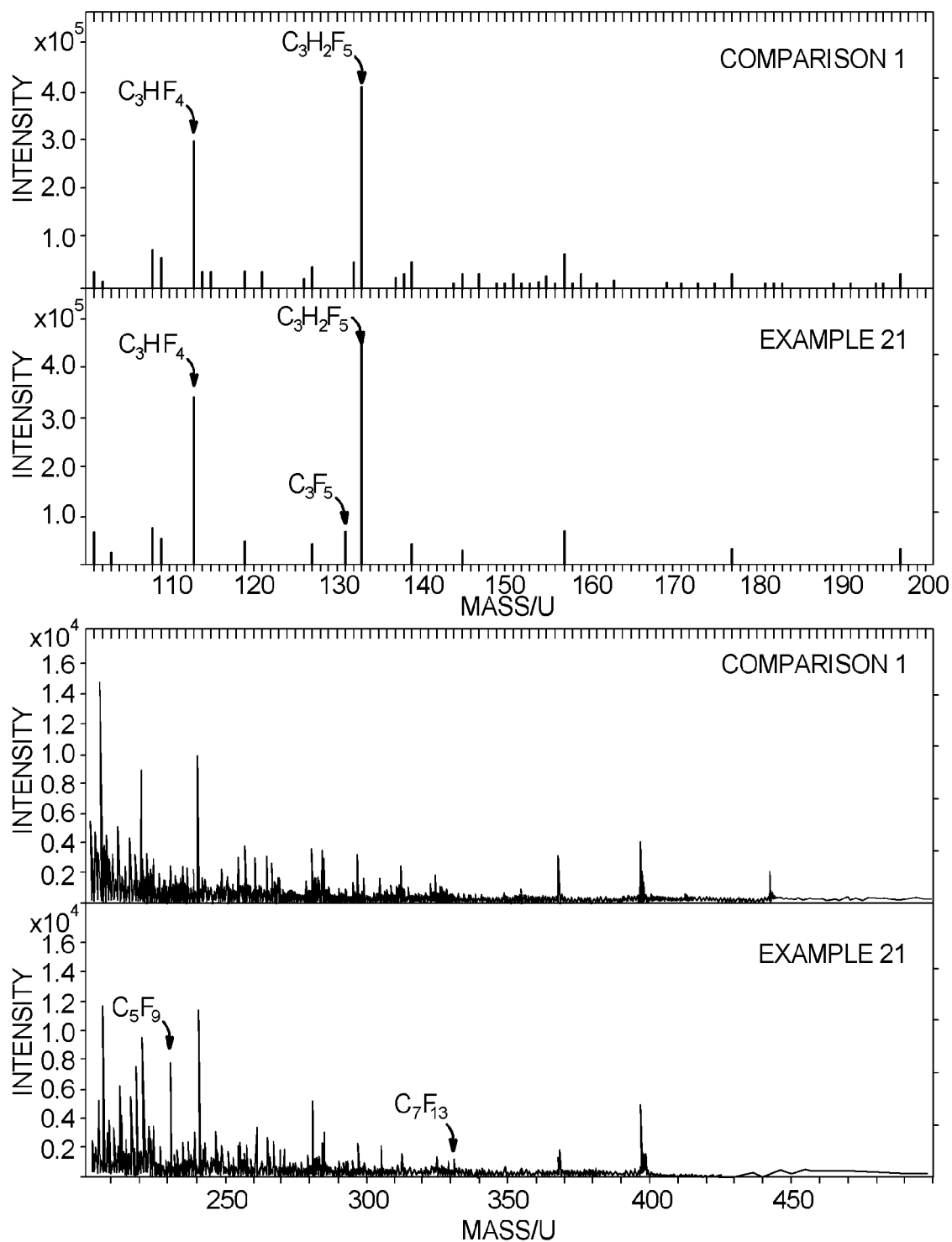
Figure 10A:
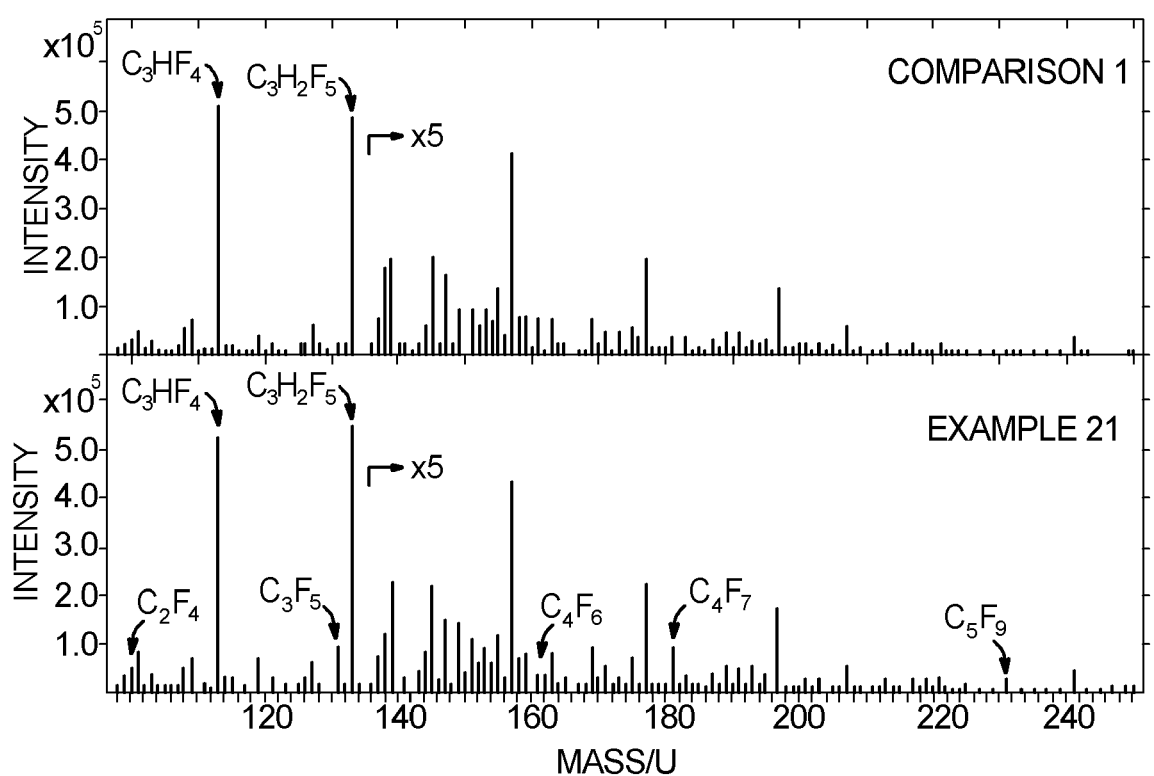

Further, the electrode surface in Example 21 and Comparison 1 was determined by Time-of-Flight secondary Ion Mass Spectrometry (TOF-SIMS). The results of the cathode electrode in Example 21 and Comparison 1 which are determined based on TOF-SIMS positive secondary ion mass spectrometry are shown in FIGS. 9A and 9B as well as FIGS. 10A and 10B. The results of the cathode electrode in Example 21 and Comparison 1, which are determined based on TOF-SIMS negative secondary ion mass spectrometry, are shown in FIG. 11.

As shown in FIGS. 9 to 11, a peak of a fragment based on positive secondary ions of $C_3F_5$, $C_5F_9$, $C_7F_{13}$, and $Li_4PO_4$ and negative secondary ions of $PO_2$, $PO_3$, $LiP_2O_4$, $LiP_2O_5$, $LiP_2O_6$, $LiPO_2F$, $LiPO_3F$, $POF_2$, $PO_2F_2$, and $LiPO_3H$ was observed.

Figure 12:
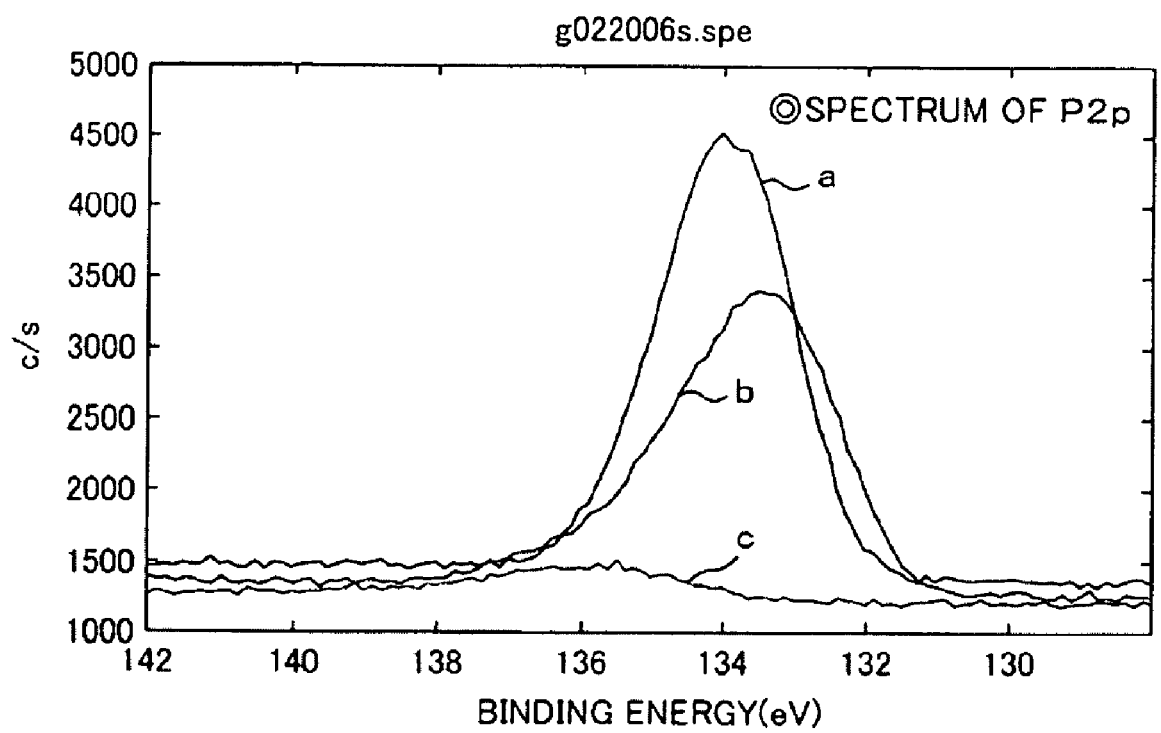
FIG. 12 is a graph showing results of the surface analysis by X-ray photoelectron spectroscopy in Example 21 and Comparison 1.

In addition, the results of the surface analysis by X-ray photoelectron spectroscopy in Example 21 and Comparison 1 are shown in FIG. 12. The line a shows the analysis results of the cathode electrode before the charging and discharging in Example 21. The line b shows the analysis results of the cathode electrode after the first charging and discharging in Example 21. The line c shows the analysis results of the cathode electrode after the first charging and discharging in Comparison 1. Here, the cathode electrode after the first charging and discharging is the cathode electrode which is washed with dimethyl carbonate (DMC) after dismounting of the battery, followed by vacuum drying at 50° C.

As shown in FIG. 12, the P 2p spectrum derived from $LiPF_6$ in the electrolytic solution used for the battery was also observed after the first charging and discharging in Comparison 1, where phosphorous acid was not added. The difference between Comparison 1 and Example 21 is clear from the difference of the peak intensity and a peak in the P 2p spectrum derived from the phosphorus compound contained in the cathode can be confirmed.

It should be understood by those skilled in the art that various modifications, combinations, sub-combinations and alterations may occur depending on design requirements and other factors insofar as they are within the scope of the appended claims or the equivalents thereof. For example, the cathode active material layer 13B may contain other cathode active materials in addition to the cathode active materials described above.

Examples of other cathode active materials include a lithium cobalt composite oxide having a rock-salt layer structure that contains lithium and cobalt, and a lithium manganese composite oxide having a spinel structure that contains lithium and manganese.

In addition, a so-called lithium-ion secondary battery in which the capacity of the anode is represented by a capacity component determined by occlusion and release of lithium has been described in the above-mentioned embodiments and Examples. The present application can be similarly applied to a so-called lithium metal secondary battery in which lithium metal is used for the anode active material and the capacity of the anode is represented by a capacity component determined by precipitation and dissolution of lithium. Further, the present application can be similarly applied to a secondary battery in which the capacity of the anode is represented by the sum of the capacity component determined by occlusion and release of lithium and the capacity component determined by precipitation and dissolution of lithium by lowering the charging capacity of the anode material capable of occluding and releasing lithium than the charging of the cathode.

Furthermore, the case where the present application is applied to the secondary batteries of a flat type, a cylindrical type, and a square type has been described in the above-mentioned embodiments and Examples. The present application can be similarly applied to the secondary batteries of a button type, a thin type, a large type, and a stacked lamination type. Further, the present application can be applied to not only the secondary batteries but also primary batteries.

Subsequently, the fifth embodiment of the present application will be described with reference to the accompanying drawings. A method for manufacturing a cathode according to the fifth embodiment includes the steps of: mixing phosphorous acid ($H_3PO_3$) with cathode active material to prepare a cathode mixture slurry; and applying the cathode mixture slurry to a cathode current collector to form a cathode active material layer.

With reference to the method for manufacturing a cathode according to the fifth embodiment, the cathode active material is mixed with phosphorous acid ($H_3PO_3$) when preparing the cathode mixture slurry, and thus the distribution of binders and conductive auxiliary agents in the cathode active material layer is changed at the time of coating and drying the cathode mixture slurry, which allows for improving the winding characteristics of an electrode.

As the cathode active material, a lithium composite oxide capable of occluding and releasing lithium can be used. Specific examples of the lithium composite oxide to be used herein include the lithium composite oxides having an average composition represented by Formula I and further preferable examples thereof include lithium composite oxides having an average composition represented by Formula II which contain the highest proportion of nickel Ni among constituent metal elements except lithium:

  (Chemical formula I)

wherein M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and x, y, z, a, and b are values in the range of 0.8<x≦1.2, 0≦y≦1.0, 0≦z≦1.0, 1.8≦b≦2.2, and 0≦a≦1.0 respectively, $$Li_xCo_yNi_zM_{1-y-z}O_{b-a}X_a \quad \text{(Chemical Formula II)}$$

wherein M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and x, y, z, a, and b are values in the range of 0.8≦x≦1.2, 0≦y≦0.5, 0.5≦z≦1.0, 1.8≦b≦2.2, and 0≦a≦1.0, respectively.

Usable examples of the binder include polyvinylidene fluoride (PVdF), and polytetrafluoroethylene. Usable examples of the conductive auxiliary agent include carbon powders such as graphite and carbon black.

Phosphorous acid ($H_3PO_4$) is added at the time of kneading the cathode active material with binders such as polyvinylidene fluoride (PVdF) and solvents such as N-methyl-2-pyrrolidone (NMP). In this regard, conductive auxiliary agents such as graphite may be added at the time of the kneading.

The addition amount of phosphorous acid ($H_3PO_3$) is set to 0.01 parts by weight or more and 5.0 parts by weight or less to 100 parts by weight of cathode active material. When the addition amount of phosphorous acid ($H_3PO_3$) is less than 0.01 parts by weight, the obtained effect is not sufficient. When the addition amount exceeds 5.0 parts by weight, the cathode active material is peeled off from aluminum foil of the collector, and thus it is difficult to press or wind.

It is preferable that the addition amount of phosphorous acid ($H_3PO_3$) is 0.05 parts by weight or more and 5.0 parts by weight or less to 100 parts by weight of cathode active material, in the case where a lithium composite in which the content of nickel Ni is higher than that of cobalt Co, among lithium composites having an average composition represented by Formula I, is contained as a cathode active material. This is because more excellent winding characteristics as well as sufficient cycle characteristics can be obtained in the range.

It is preferable that the addition amount of phosphorous acid ($H_3PO_3$) is 0.01 parts by weight or more and 1.0 parts by weight or less to 100 parts by weight of cathode active material, in the case where a lithium composite in which the content of nickel Ni is lower than that of cobalt Co, among lithium composites having an average composition represented by Formula I, is contained as a cathode active material. This is because more excellent winding characteristics as well as sufficient cycle characteristics can be obtained in the range.

With reference to the method for manufacturing a cathode according to the fifth embodiment, the distribution of binders and conductive auxiliary agents in the electrode is changed by adding phosphorous acid ($H_3PO_3$), which allows for improving the winding characteristics of an electrode.

Since the binders and the conductive auxiliary agents are distributed in the electrode so as not to fill a gap between the primary particles of the cathode active material, the capacity for large discharge currents (load characteristics) can be improved.

Further, in the lithium composite oxide whose composition contains nickel Ni, LiOH, which is formed on the surface of the active material as an impurity, is gradually carbonated in the air, and thus it is necessary to handle it carefully in the air. In the manufacture method a cathode according to an embodiment, the LiOH formed on the surface of lithium composite oxide is converted to phosphoric acid lithium with a low reactivity by treating with phosphorous acid ($H_3PO_3$), thereby preventing it from absorbing carbon dioxide gas in the air. Thus, there is provided a nonaqueous electrolyte battery which is stable as a product since expansion and deterioration of cycle characteristics are reduced.

Figure 13:
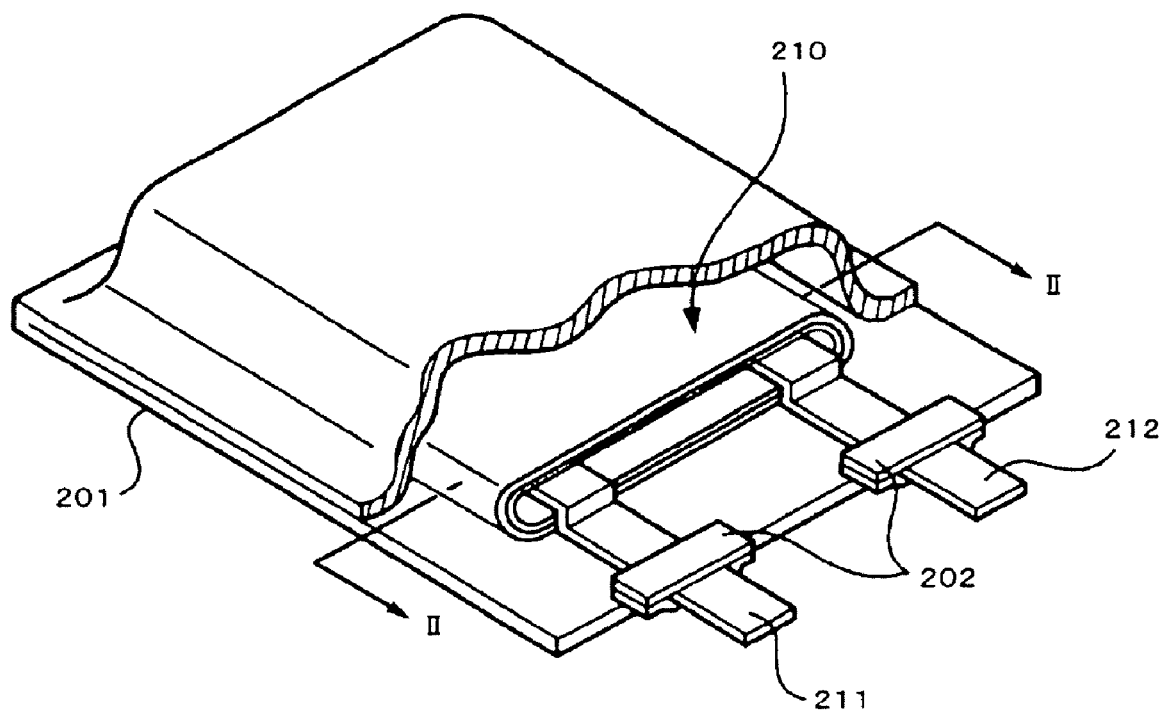
FIG. 13 is a perspective view showing a first example of the nonaqueous electrolyte battery.

An example of the nonaqueous electrolyte secondary battery that is formed by using the cathode produced by the above-mentioned manufacturing method will be described. FIG. 13 is a perspective view showing the first example of the nonaqueous electrolyte battery. The nonaqueous electrolyte battery is, for example, a nonaqueous electrolyte secondary battery. The nonaqueous electrolyte battery has the spiral electrode body 210 on which the cathode lead 211 and the anode lead 212 are mounted in a film-shaped exterior member 201 and has a flat type.

Each of the cathode lead 211 and the anode lead 212 has a stripe-shaped, and is drawn, respectively from the inside of the exterior member 201 to the outside, for example, in the same direction. The cathode lead 211 is made of metallic materials such as aluminium Al and the anode lead 212 is made of metallic materials such as nickel Ni.

The exterior member 201 is a laminated film having a structure in which, for example, the insulating layer, the metal layer, and the outermost are stacked sequentially in this order and then combined by lamination. In the exterior member 201, for example, the insulating layer is faced inwardly and the respective outer edges are bonded by welding or by using adhesives.

The insulating layer is made of polyethylene, polypropylene, modified polyethylene, modified polypropylene or polyolefin resins such as copolymers thereof. This is because the moisture permeability is decreased and an excellent airtightness is provided. The metal layer is made of aluminium Al, stainless steel SUS, nickel Ni, or iron Fe in foil-shaped or plate form.

The outermost layer may be made of, for example, the same resin as that of the insulating layer and further may be made of nylon. This is because resistance to breakage or sticking can be improved. The exterior member 1 may include other layers in addition to the insulating layer, the metal layer, and the outermost layer.

In order to improve the adhesion of the cathode lead 211 and the anode lead 212 to the inside of the exterior member 201 and prevent outside air from entering, an adherent film 202 is inserted between the exterior member 201 and the cathode lead 211, and between the exterior member 201 and the anode lead 212. The adherent film 202 is made of a material having adhesion to the cathode lead 211 and the anode lead 212. For example, the adherent film is preferably made of polyolefin resins such as polyethylene, polypropylene, modified polyethylene, or modified polypropylene in the case where the cathode lead 211 and the anode lead 212 is made of the metallic materials described above.

Figure 14:
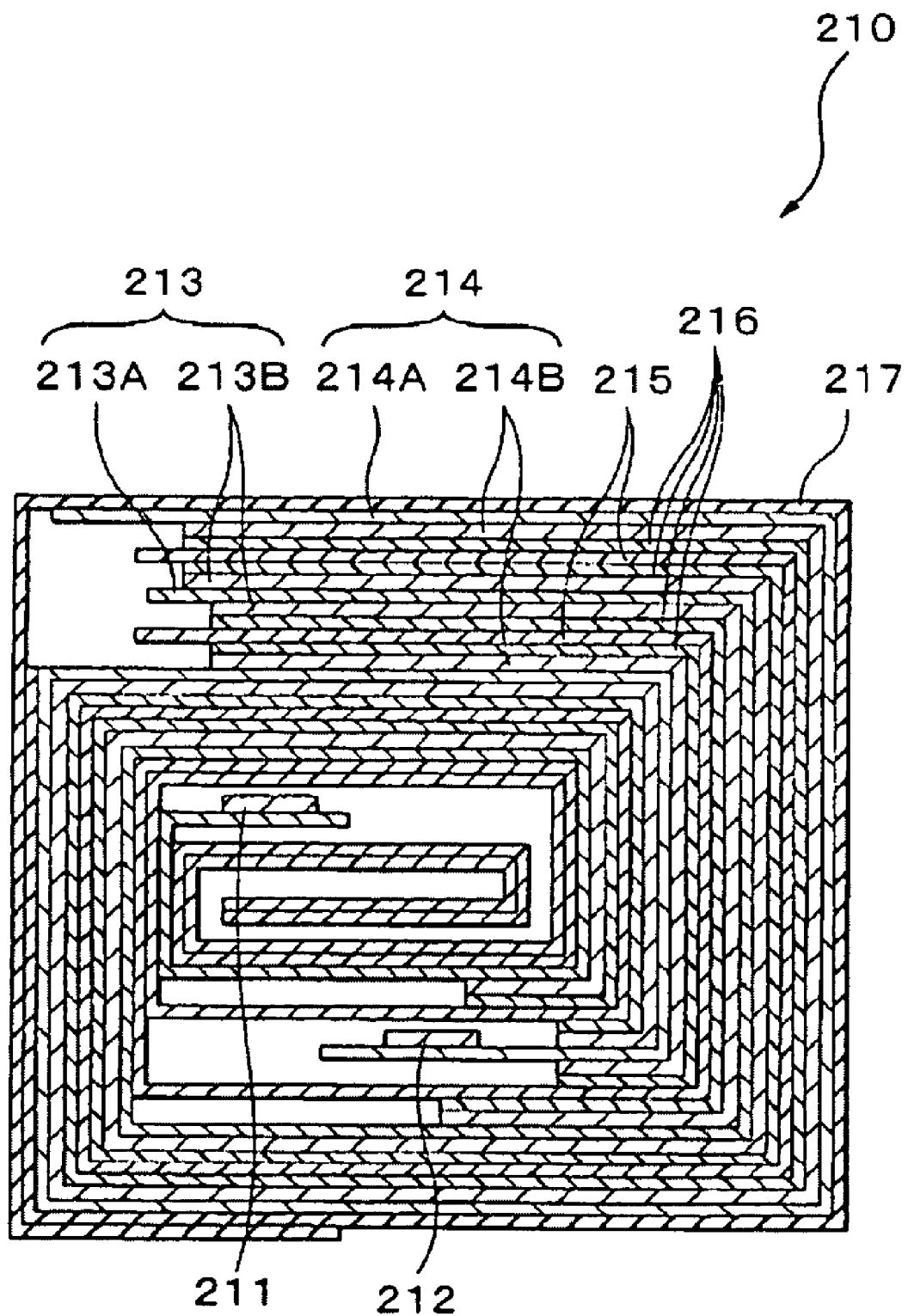
FIG. 14 is a cross-sectional view along the line II-II of the spiral electrode body 110 shown in FIG. 2.

FIG. 14 is a cross-sectional view along the line II-II of the spiral electrode body 210 shown in FIG. 13. The spiral electrode body 210 is formed by stacking a cathode 213 and an anode 214 via a separator 215 and an electrolyte 216 and winding them. The outermost periphery thereof is protected by a protective tape 217.

For example, the cathode 213 has a cathode current collector 213A and a cathode active material layer 213B that is formed on both sides of the cathode current collector 213A. The cathode current collector 213A is made of metal foil such as aluminum foil.

The cathode active material layer 213B includes the cathode active material that has the lithium composite oxide and the phosphorus compound which is contained near the surface of the lithium composite oxide. In addition, the cathode active material layer 13B includes the conductive auxiliary agent such as the carbon material; and the binder such as polyvinylidene fluoride (PVdF) or polytetrafluoroethylene.

The phosphorus compound is a compound in which the binding energy peak in the P 2p spectrum based on X-ray photoelectron spectroscopy (XPS) is in the range of 132 to 135 eV. At least a part of the phosphorus compound is represented by, for example, Formula III or IV:

$$Li_cCo_dH_eP_fO_g \quad \text{(Chemical formula III)}$$

wherein c, e, and f represent an integer of 1 or more; and d and e represent an integer of 0 or more, $$Li_gPO_hF_i \quad \text{(Chemical formula IV)}$$

wherein g, h, and i represent an integer of 1 or more.

These phosphorus compounds are present near the surface of lithium composite oxide particles, for example, it is present so as to cover the lithium compound oxide particles. As a method for confirming that these phosphorus compounds are present near the surface of lithium composite oxide particles, for example, a method in which the cathode 213 is embedded in resin and then the distribution in the cross section is determined by Time-of-Flight secondary Ion Mass Spectrometry (TOF-SIMS) is listed. Alternatively, it can be confirmed by analyzing elements by X-ray photoelectron spectroscopy while the cathode surface is spattered with argon.

The cathode active material layer 213B has a peak of a fragment of at least one secondary ion selected from the group consisting of positive secondary ions of $Li_4PO_4$, $C_3F_5$, $C_5F_9$, $C_7F_{13}$, negative secondary ions of $PO_2$, $PO_3$, $LiP_2O_4$, $LiP_2O_5$, $LiP_2O_6$, $LiPO_2F$, $LiPO_3F$, $POF_2$, $PO_2F_2$, and $LiPO_3H$ based on the surface analysis by Time-of-Flight secondary Ion Mass Spectrometry (TOF-SIMS) is observed near the surface.

The cathode active material layer 213B has a peak of a fragment of at least one secondary ion selected from the group consisting of positive secondary ions of $Li_4PO_4$, $Li_2CoPO_4$, $Li_2CoPH_2O_4$, $Li_3CoPO_4$, and $Li_3CoPO_4H$, negative secondary ions of $PO_2$, $LiP_2O_4$, $Co_2PO_4$, $CoP_2O_5$, $CoP_2O_5H$, $CoP_2O_6$, and $CoP_2O_6H$ based on the surface analysis by TOF-SIMS.

It is preferable that the thickness of the cathode 213 is 250 μm or less.

For example, as with the anode 213, the anode 214 has an anode current collector 214A and an anode active material layer 214B that is formed on both sides of the anode current collector 214A. The anode current collector 214A is made of metal foil such as copper foil.

The anode active material layer 214B include any one, or two or more of the anode material capable of occluding and releasing lithium as an anode active material and may also include conductive auxiliary agents and binders, if necessary.

Examples of the anode material capable of occluding and releasing lithium include carbon materials such as graphite, non-graphitizable carbon, or graphitizable carbon. Any one of the carbon materials may be used alone or two or more of them may be used in combination. Further, two or more of carbon materials with different mean particle diameters may be mixed.

Further, the cathode material capable of occluding and releasing lithium is defined as a cathode material capable of occluding and releasing lithium and examples thereof include materials which contain a metal element capable of forming lithium and alloy or a metalloid element as a constituting element. Specific examples include the simple substance, alloy, and compound of the metal element capable of forming lithium and alloy; or the simple substance, alloy, and compound of the metalloid element capable of forming lithium and alloy; or materials having the phases of one or two or more kinds of such materials in at least one part thereof.

Examples of the metal element or metalloid element include tin Sn, lead Pb, aluminum, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, or hafnium Hf. Among them, metal elements of Group 14 of the long-period periodic table or metalloid elements are preferable. A particularly preferable example is silicon Si or tin Sn. This is because silicon Si and tin Sn have a large ability to occlude and release lithium and a high energy density can be obtained.

Examples of the alloy of silicon Si include alloys containing at least one among the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than silicon Si. Examples of the alloy of tin Sn include alloys containing at least one among the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as the second constituting element other than tin Sn.

As a compound of silicon Si or a compound of tin Sn, for example, a compound containing oxygen O or carbon C is listed. In addition to silicon Si or tin Sn, the second constituting element described above may be contained.

Any material may be used for the separator 215 as long it is electrically stable, chemically stable toward the cathode active material, the anode active material, or the solvent and has an electrical conductivity. For example, a nonwoven fabric made of polymer, a porous film, glass, or a paper-shaped sheet made of fibers of ceramics can be used and a plurality of them may be stacked for use. Particularly, it is preferable to use a porous polyolefin film. Further, the porous polyolefin film may be combined with polyimide, glass, or heat-resistant materials made of ceramic fibers for use.

The electrolyte 216 contains an electrolytic solution and a support containing a polymeric compound and is the so-called gel layer. The electrolytic solution contains an electrolyte salt and a solvent to dissolve the electrolyte salt. Examples of the electrolyte salt include lithium salts such as $LiPF_6$, $LiClO_4$, $LiBF_4$, $LiN(SO_2CF_3)_2$, and $LiN(SO_2C_2F_5)_2$, and $LiAsF_6$. Any one of the electrolyte salts may be used alone or two or more of them may be used in combination.

Examples of the solvent include lactone-based solvents such as γ-butyrolactone, γ-valerolactone, δ-valerolactone, and ε-caprolactone; carbonate solvents such as ethylene carbonate, propylene carbonate, butylene carbonate, vinylene carbonate, dimethyl carbonate, ethyl methyl carbonate, and diethyl carbonate; ether-based solvents such as 1,2-dimethoxy ethane, 1-ethoxy-2-methoxy ethane, 1,2-diethoxy ethane, tetrahydrofuran, and 2-methyl tetrahydrofuran; nitrile-based solvents such as acetonitriles; sulfolane solvents; phosphoric acids; phosphate solvents; or nonaqueous solvents such as pyrolidones. Any one of the solvents may be used alone or two or more of them may be used in combination.

Further, it is preferable that a compound in which a part or all of hydrogen atoms of a cyclic ester or chain ester is fluorinated is contained as a solvent. Preferable examples of the fluorinated compound to be used herein include difluoro ethylene carbonate (4,5-difluoro-1,3-dioxolane-2-on). Even when the anode 114 that contains compounds such as silicon Si, tin Sn, and germanium Ge as the anode active materials is used, charge-discharge cycle characteristics can be improved.

This is because, particularly, fluoroethylene carbonate has an excellent effect on the improvement in the cycle-characteristics.

Any polymeric compound may be used as long as it can absorb a solvent to turn into a gel. Examples thereof include fluorinated polymeric compounds such as polyvinylidene fluoride and a copolymer of vinylidene fluoride and hexa fluoro propylene; ether-based polymeric compounds such as polyethylene oxide and a crosslinking monomer containing polyethylene oxide; and a compound containing polyacrylonitrile, polypropylene oxide, or polymethylmethacrylate as a repeating unit. Any one of the polymeric compounds may be used alone or two or more of them may be used in combination.

Particularly, from the point of view of the redox stability, fluorinated polymeric compounds are desirable. Among them, a copolymer containing vinylidene fluoride and hexa fluoro propylene as components is preferable. Additionally, the copolymer may contain a monoester of an unsaturated dibasic acid such as monomethyl maleate; halogenated ethylene such as trifluoroethylene; a cyclic ester carbonate of an unsaturated compound such as vinylene carbonate; or an acrylic vinyl monomer containing an epoxy group as a component. This is because higher characteristics can be obtained.

Hereinafter, the method for manufacturing the nonaqueous electrolyte battery of the first example will be described.

First, the cathode active material layer 213B is formed on, for example, the cathode current collector 213A and the cathode 213 is fabricated. Since the formation method of the positive active material layer 213B has been described, a detailed description will not be repeated here. Further, the anode active material layer 214B is formed on, for example, the anode current collector 214A and the anode 214 is fabricated. As for the anode active material layer 214B, the anode active material and the binder were mixed to prepare an anode mixture and then the anode mixture was dispersed in a solvent such as N-methyl-2-pyrrolidone (NMP) to provide a paste-shaped anode mixture slurry.

Next, the anode mixture slurry was applied to the anode current collector 222A and the solvent was dried, followed by compression molding with a roll presser to form the anode active material layer 222B. Then, the anode 222 was fabricated. Next, the cathode lead 211 is mounted on the cathode current collector 213A and the anode lead 212 is mounted on the anode current collector 214A.

Subsequently, the electrolytic solution and the polymeric compound are mixed using the combined solvent. The resulting mixed solution is applied onto the cathode active material layer 213B and the anode active material layer 214B and then the combined solvent is volatilized to form the electrolyte 216. Then, the cathode 213, separator 215, anode 214, and separator 215 are stacked sequentially in this order and then are wound. The protective tape 217 is adhered to outermost periphery thereof in order to form the spiral electrode body 210. Thereafter, the spiral electrode body 210 is sandwiched between the exterior members 201 and then the outer edges of the exterior members 201 are heat-sealed. During the process, the adherent film 202 is inserted between the cathode lead 211 and the exterior member 201, and between the anode lead 212 and the exterior member 201. Thus, the nonaqueous electrolyte battery shown in FIG. 13 is obtained.

Further, the cathode 213 and the anode 214 are not wound after forming the electrolyte 216 thereon, but the cathode 213 and anode 214 are wound via the separator 215 and sandwiched between the exterior members 201. Then, an electrolyte composition, which contains the electrolytic solution and a monomer of the polymeric compound, may be injected so that the monomer is polymerized in the exterior member 201.

When this nonaqueous electrolyte battery is charged, a lithium ion is released from, for example, the cathode 213 and occluded into the anode 214 via the electrolyte 216. On the other hand, when the nonaqueous electrolyte battery is discharged, a lithium ion is released from, for example, the anode 214 and occluded into the cathode 213 via the electrolyte 216.

Next, the second example of the nonaqueous electrolyte battery will be described. With reference to the nonaqueous electrolyte battery according to the second example, an electrolytic solution is used in place of the gel electrolyte 216 in the nonaqueous electrolyte battery according to the first example. In this case, the separator 215 is impregnated with the electrolytic solution. The same electrolytic solution as that of the first example of the nonaqueous electrolyte battery can be used.

The nonaqueous electrolyte battery having such a structure may be fabricated, for example, in the following manner. The spiral electrode body 210 is fabricated by winding the cathode 213 and the anode 214 in the same manner as described in the first example of the nonaqueous electrolyte battery except for the gel electrolyte 216 is not formed. The spiral electrode body 210 is sandwiched between the exterior members 201. Then the electrolytic solution is injected and the exterior member 201 is sealed.

The structure of the third example of the nonaqueous electrolyte battery will be described with reference to FIGS. 15 and 16.

Figure 15:
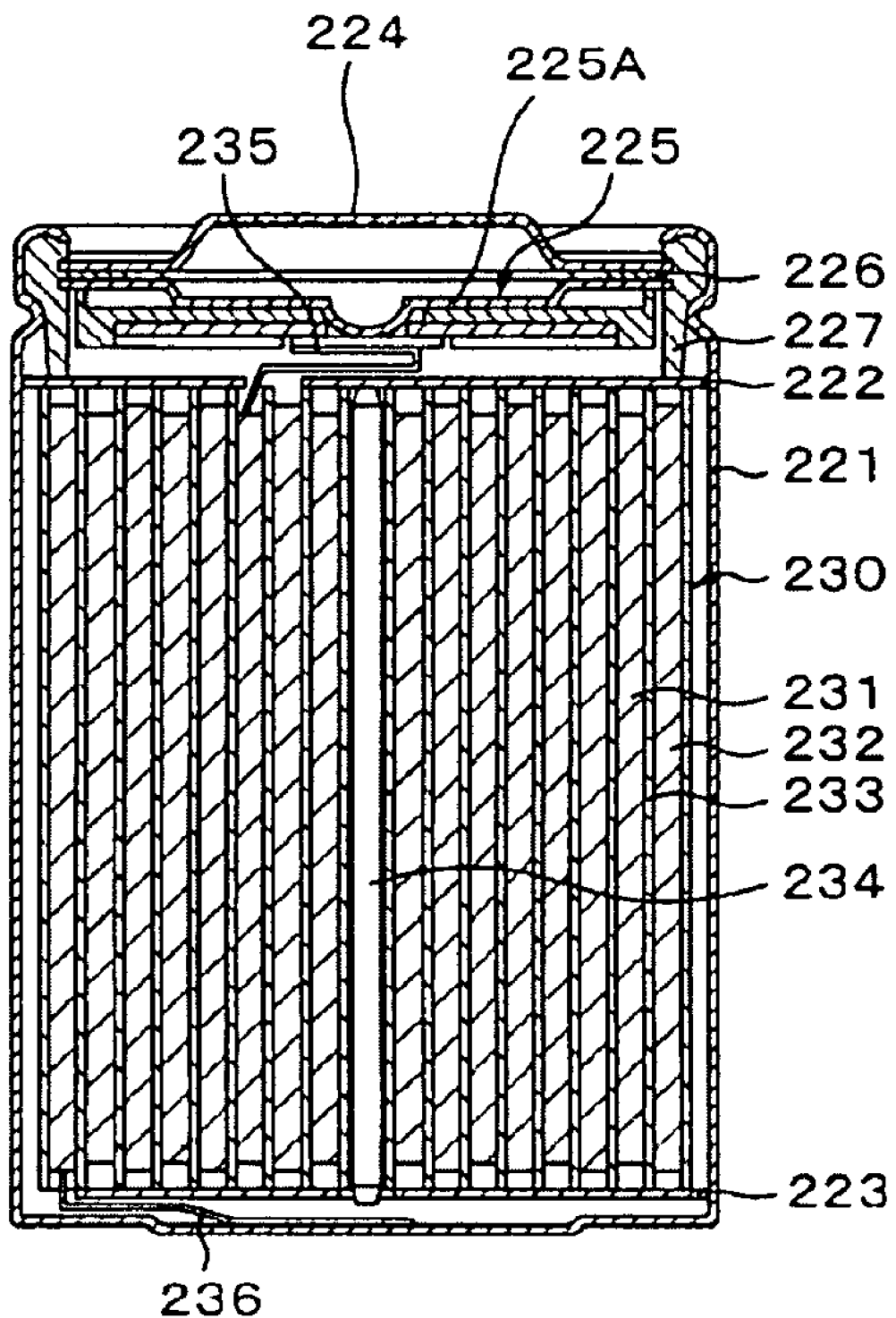
FIG. 15 is a cross-sectional view showing a third example of the nonaqueous electrolyte battery.

FIG. 15 shows structure of the third example of the nonaqueous electrolyte battery. This nonaqueous electrolyte battery is the so-called cylindrical shape and includes a spiral electrode body 230 in which a band-shaped cathode 231 and a band-shaped anode 232 are wound via a separator 233 in a hollow cylinder-shaped battery can 221 which is a cylinder can as the exterior member 201. The separator 233 is impregnated with an electrolytic solution which is a liquid electrolyte. The battery can 221 is made of iron Fe plated with nickel Ni and one end thereof is closed, and the other end is opened. In the battery can 221, a pair of insulating plates 222 and 223 are arranged to sandwich the spiral electrode body 230 perpendicularly to a periphery surface thereof.

A battery lid 224, and a safety valve mechanism 225 and a positive temperature coefficient (PTC) element 226 which are positioned inside the battery lid 224, are mounted in the open end of the battery can 221 by caulking via a gasket 227 to seal the inside of the battery can 221. The battery lid 224 is made of the same material as that of the battery can 221. The battery lid 224 is made of the same material as the battery can 121. The safety valve mechanism 225 is electrically connected to the battery lid 224 through a heat sensitive resistive element 226. When an internal pressure of the battery becomes more than certain value due to internal short circuit or heating from outside, a disk plate 225A is inverted to cut the electric connection between the battery lid 224 and the spiral electrode body 230. The heat sensitive resistive element 226 restricts electric currents, when its resistance increases with an increase in temperature, to prevent unusual heat generation due to high electric currents. The gasket 227 is made of an insulating material and asphalt is applied to the surface thereof.

The spiral electrode body 230 is wound around, for example, a center pin 234. A cathode lead 235 containing aluminum Al or the like is connected to the cathode 231 of the spiral electrode body 230, and an anode lead 236 containing nickel Ni or the like is connected to the anode 232. The cathode lead 235 is welded to the safety valve mechanism 225 to be electrically connected with the battery lid 224. The anode lead 236 is welded to the battery can 221 to be electrically connected.

Figure 16:
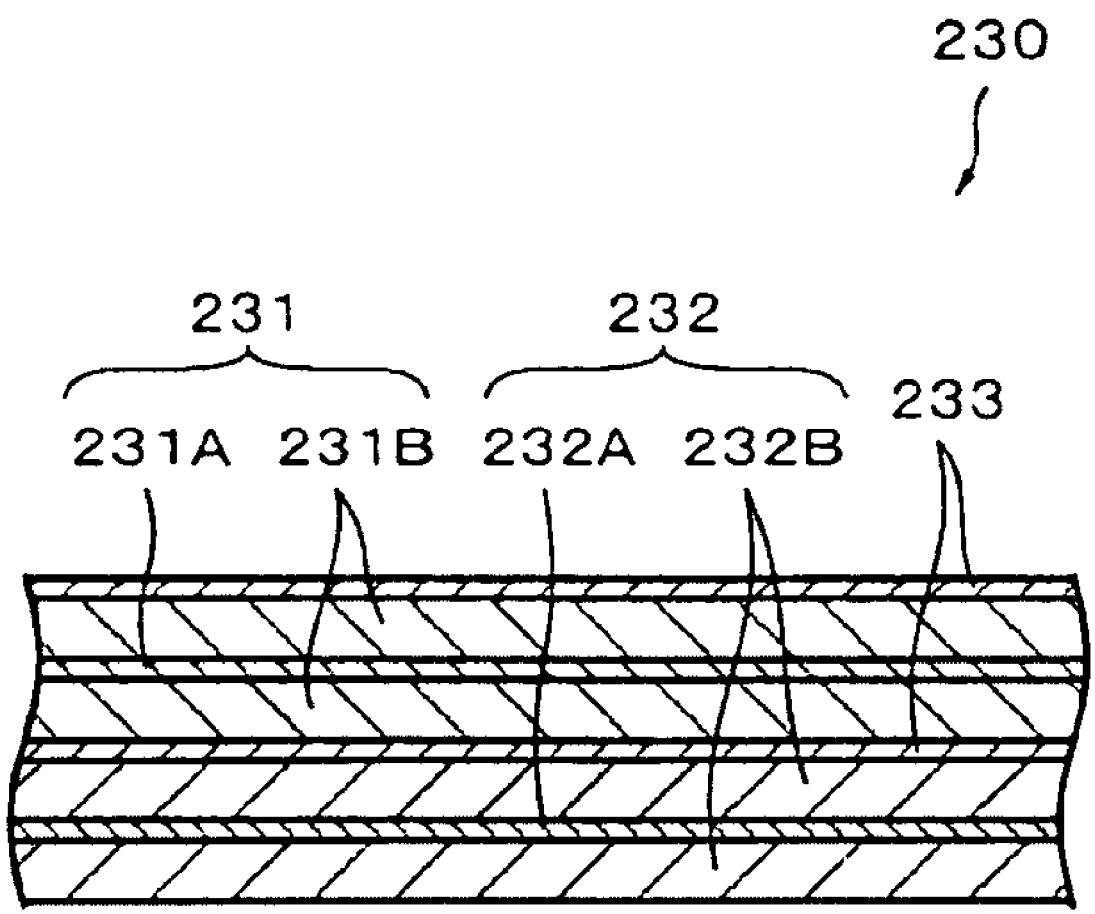
FIG. 16 is a partly enlarged cross-sectional view showing the spiral electrode body 130 shown in FIG. 4.

FIG. 16 is a partly enlarged cross-sectional view showing the spiral electrode body 230 shown in FIG. 15. The spiral electrode body 230 is formed by laminating and winding the cathode 231 and the anode 232 via the separator 233.

For example, the cathode 231 has a cathode current collector 231A and a cathode active material layer 231B that is formed on both sides of the cathode current collector 231A. For example, the anode 232 has an anode current collector 232A and an anode active material layer 232B that is formed on both sides of the anode current collector 232A. Each structure of the cathode current collector 231A, the cathode active material layer 231B, the anode current collector 232A, the anode active material layer 232B, the separator 233, and the electrolytic solution is the same as that of the cathode current collector 213A, the cathode active material layer 213B, the anode current collector 214A, the anode active material layer 214B, the separator 215, and the electrolytic solution in the first embodiment.

Subsequently, the method for manufacturing of the nonaqueous electrolyte battery of the third example will be described.

The cathode 231 is fabricated in the following manner. As described above, the cathode active material layer 231B is formed on the cathode current collector 231A to obtain the cathode 231. Since the formation method of the positive active material layer 231B is the same as described above, a detailed description will not be repeated here.

The anode 232 is fabricated in the following manner. First, the anode active material and the binder were mixed to prepare an anode mixture and then the anode mixture was dispersed in a solvent such as N-methyl-2-pyrrolidone to give an anode mixture slurry. Next, the anode mixture slurry was applied to the anode current collector 232A and the solvent was dried, followed by compression molding with a roll presser to form the anode active material layer 232B. Then, the anode 232 was fabricated.

Next, the cathode lead 236 is fixed to the cathode current collector 231A with welding or the like, and the anode lead 236 is fixed to the anode current collector 232A. Thereafter, the cathode 231 and the anode 232 are wound sandwiching the separator 233 therebetween, a tip portion of the cathode lead 236 is welded to the safety valve mechanism 225, a tip portion of the anode lead 236 is welded to the battery can 221, and the wound cathode 231 and anode 232 are sandwiched between a pair of the insulating plates 222 and 223, and then housed inside the battery can 221. After housing the cathode 231 and anode 232 inside the battery can 221, the electrolyte is injected into the battery can 221 to be impregnated into the separator 233. Thereafter, the battery lid 224, the safety valve mechanism 225, and the heat sensitive resistive element 226 are caulked and fixed to an opening end of the battery can 221 through the gasket 227. As described above, the nonaqueous electrolyte battery shown in FIG. 15 is fabricated.

Although a cylinder can is used as an exterior member in the third example of the nonaqueous electrolyte battery, the generation of gas is inhibited by using the cathode produced by the method for manufacturing a cathode according to an embodiment. Therefore, breakage due to the increased internal pressure that is produced by the generation of gas can be prevented.

Figure 17:
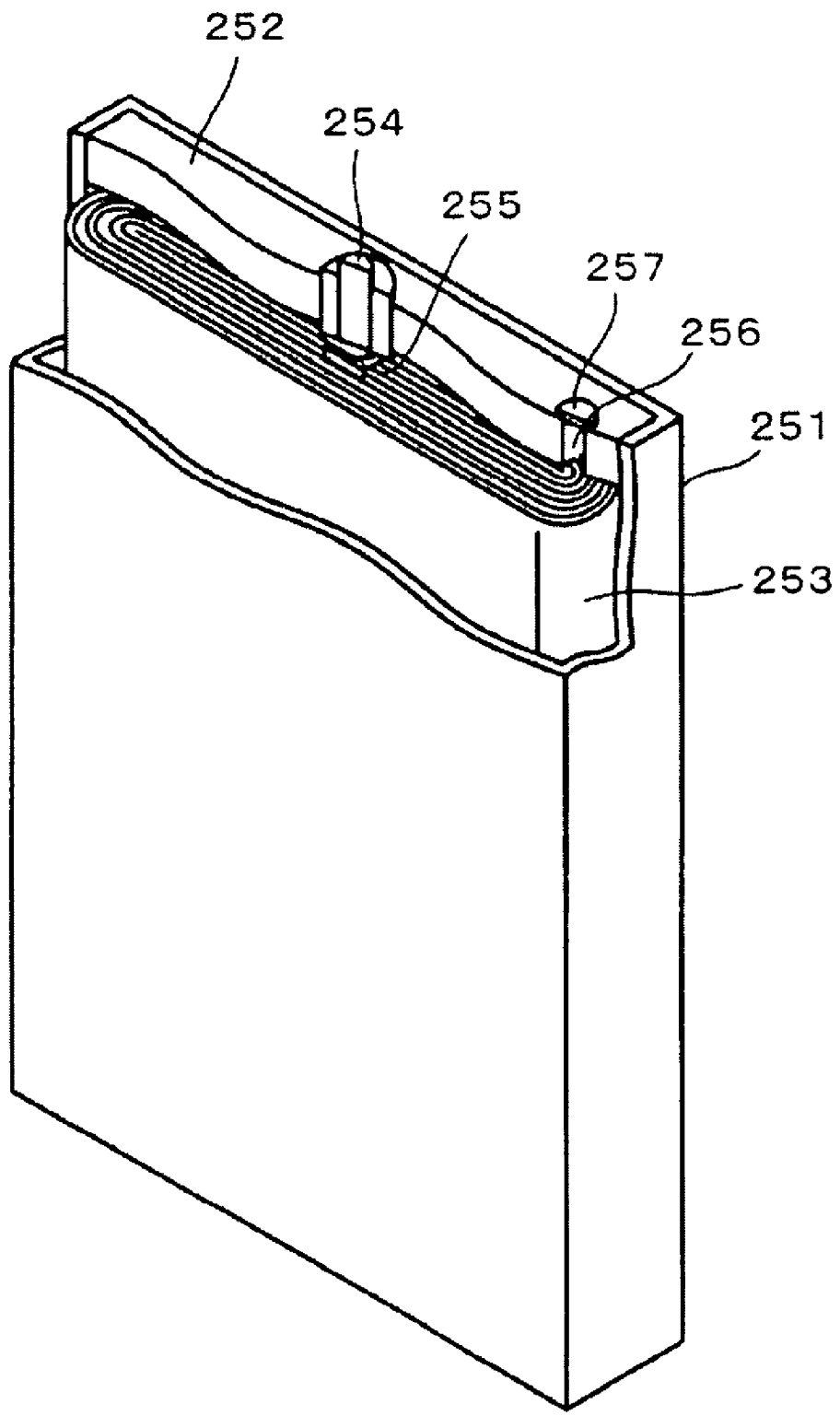
FIG. 17 is a perspective view showing a fourth example of the nonaqueous electrolyte battery.

Subsequently, the fourth example of the nonaqueous electrolyte battery will be described. The fourth example is the nonaqueous electrolyte battery having a square shape. As shown in FIG. 17, in the fourth example, a spiral electrode body 153 is housed in an exterior can 251 having a square shape which is made of metals such as aluminium Al and iron Fe. Then, an electrode pin 254 provided on a battery lid 252 is connected with an electrode terminal 255 drawn from the spiral electrode body 153 and the exterior can is closed by the battery lid 252. The electrolytic solution is injected from an electrolytic solution inlet 256, then the inlet is sealed by a sealing member 257 and the nonaqueous electrolyte battery is fabricated. In this regard, the spiral electrode body 153 is the same as the first example, a detailed description will not be repeated here.

Although the exterior can 251 having a square shape can is used as an exterior member in the fourth example of the nonaqueous electrolyte battery, the generation of gas is inhibited by using the cathode produced by the method for manufacturing a cathode according to an embodiment. Therefore, breakage due to the increased internal pressure that is produced by the generation of gas can be prevented.

EXAMPLES

Herein below, specific examples of the fifth embodiment will be described, but the fifth embodiment is not to be construed as being limited thereto.

Sample 1

2.0 parts by weight of polyvinylidene fluoride (PVdF) and 1.0 parts by weight of graphite were added to 100 parts by weight of composite oxide particles having an average composition of $Li_{0.98}Co_{0.20}Ni_{0.80}O_{2.1}$ and a mean particle diameter of 12 μm which was determined by the laser scattering method. While the resulting mixture was kneaded with N-methyl-2-pyrrolidone (NMP) and further 0.05 parts by weight of phosphorous acid ($H_3PO_3$) was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 1 was obtained.

Sample 2

2.0 parts by weight of polyvinylidene fluoride (PVdF) and 1.0 parts by weight of graphite were added to 100 parts by weight of composite oxide particles having an average composition of $Li_{0.98}Co_{0.20}Ni_{0.80}O_{2.1}$ and a mean particle diameter of 12 μm which was determined by the laser scattering method. While the resulting mixture was kneaded with N-methyl-2-pyrrolidone (NMP) and further 0.10 parts by weight of phosphorous acid ($H_3PO_3$) was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 2 was obtained.

Sample 3

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 0.20 parts by weight of phosphorous acid ($H_3PO_3$) was added thereto, which was well kneaded for 1 hour. Thereafter, the obtained mixture was thinly applied onto Al foil 15 μm thick, which was dried, followed by cutting into the predetermined size and thus the cathode electrode in Sample 3 was obtained.

Sample 4

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 0.50 parts by weight of $H_3PO_3$ was added thereto, which was well kneaded for 1 hour. Thereafter, the obtained mixture was thinly applied onto Al foil 15 μm thick, which was dried, followed by cutting into the predetermined size and thus the cathode electrode in Sample 4 was obtained.

Sample 5

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 1.0 parts by weight of $H_3PO_3$ was added thereto, which was well kneaded for 1 hour. Thereafter, the obtained mixture was thinly applied onto Al foil 15 μm thick, which was dried, followed by cutting into the predetermined size and thus the cathode electrode in Sample 4 was obtained.

Sample 6

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 3.0 parts by weight of $H_3PO_3$ was added thereto, which was well kneaded for 1 hour. Thereafter, the obtained mixture was thinly applied onto Al foil 15 μm thick, which was dried, followed by cutting into the predetermined size and thus the cathode electrode in Sample 6 was obtained.

Sample 7

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 5.0 parts by weight of $H_3PO_3$ was added thereto, which was well kneaded for 1 hour. Thereafter, the obtained mixture was thinly applied onto Al foil 15 μm thick, which was dried, followed by cutting into the predetermined size and thus the cathode electrode in Sample 7 was obtained.

Sample 8

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 0.01 parts by weight of $H_3PO_3$ was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 8 was obtained.

Sample 9

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 0.10 parts by weight of $H_3PO_3$ was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 9 was obtained.

Sample 10

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 0.50 parts by weight of $H_3PO_3$ was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 10 was obtained.

Sample 11

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 1.0 parts by weight of $H_3PO_3$ was added thereto, which was well kneaded for 1 hour. Thereafter, the obtained mixture was thinly applied onto Al foil 15 μm thick, which was dried, followed by cutting into the predetermined size and further vacuum drying at 100° C. or higher, and thus the cathode electrode in Sample 11 was obtained.

Sample 12

2.0 parts by weight of polyvinylidene fluoride (PVdF) and 1.0 parts by weight of graphite were added to 100 parts by weight of composite oxide particles having an average composition of $Li_{0.98}Co_{0.15}Ni_{0.80}Al_{0.05}O_{2.1}$ and a mean particle diameter of 14 μm which was determined by the laser scattering method. The resulting mixture was well kneaded with N-methyl-2-pyrrolidone (NMP) for 1 hour. Thereafter, the obtained mixture was thinly applied onto Al foil 15 μm thick, which was dried and then cut into the predetermined size, and the cathode electrode in Comparison 7 was obtained.

Sample 13

2.0 parts by weight of polyvinylidene fluoride (PVdF) and 1.0 parts by weight of graphite were added to 100 parts by weight of composite hydroxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 0.005 parts by weight of $H_3PO_3$ was added thereto, which was well kneaded for 1 hour. Thereafter, the obtained mixture was thinly applied onto Al foil 15 μm thick, which was dried and then cut into the predetermined size, and the cathode electrode in Comparison 2 was obtained.

Sample 14

2.0 parts by weight of polyvinylidene fluoride (PVdF) and 1.0 parts by weight of graphite were added to 100 parts by weight of composite hydroxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP), 7.0 parts by weight of $H_3PO_3$ was further added thereto, which was well kneaded for 1 hour. Thereafter, the obtained mixture was thinly applied onto Al foil 15 μm thick, which was dried and then cut into the predetermined size, and the cathode electrode in Example 14 was obtained.

Sample 15

2.0 parts by weight of polyvinylidene fluoride (PVdF) and 1.0 parts by weight of graphite were added to 100 parts by weight of composite hydroxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 3.0 parts by weight of $H_3PO_3$ was added thereto, which was well kneaded for 1 hour. Thereafter, the obtained mixture was thickly applied onto Al foil 15 μm thick, which was dried and then cut into the predetermined size, and the cathode electrode in Example 15 was obtained.

Sample 16

2.0 parts by weight of polyvinylidene fluoride (PVdF) and 1.0 parts by weight of graphite were added to 100 parts by weight of composite hydroxide particles having an average composition of $Li_{0.98}Co_{0.15}Ni_{0.80}Al_{0.05}O_{2.1}$ and a mean particle diameter of 14 μm which was determined by the laser scattering method. While the resulting mixture was kneaded with N-methyl-2-pyrrolidone (NMP) and further 5.0 parts by weight of $H_3PO_3$ was added thereto, which was well kneaded for 1 hour. Thereafter, the obtained mixture was thickly applied onto Al foil 15 μm thick, which was dried and then cut into the predetermined size, and the cathode electrode in Example 16 was obtained.

Sample 17

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. The resulting mixture was well kneaded with N-methyl-2-pyrrolidone (NMP) for 1 hour. Thereafter, the obtained mixture was thinly applied onto Al foil 15 μm thick, which was dried and then cut into the predetermined size, and the cathode electrode in Sample 17 was obtained.

Sample 18

2.0 parts by weight of polyvinylidene fluoride (PVdF) and 1.0 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 0.005 parts by weight of $H_3PO_3$ was added thereto, which was well kneaded for 1 hour. Thereafter, the obtained mixture was thinly applied onto Al foil 15 μm thick, which was dried and then cut into the predetermined size, and the cathode electrode in Sample 18 was obtained.

Sample 19

2.0 parts by weight of polyvinylidene fluoride (PVdF) and 1.0 parts by weight of graphite were added to 100 parts by weight of composite hydroxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 0.008 parts by weight of $H_3PO_3$ was added thereto, which was well kneaded for 1 hour. Thereafter, the obtained mixture was thinly applied onto Al foil 15 μm thick, which was dried and then cut into the predetermined size, and the cathode electrode in Sample 19 was obtained.

Sample 20

2.0 parts by weight of polyvinylidene fluoride (PVdF) and 1 parts by weight of graphite were added to 100 parts by weight of composite oxide particles having an average composition of $Li_{1.02}Co_{0.98}Mg_{0.01}Al_{0.01}O_{2.1}$ and a mean particle diameter of 12 μm which was determined by the laser scattering method. While the resulting mixture was kneaded with N-methyl-2-pyrrolidone (NMP) and further 6.0 parts by weight of phosphorous acid ($H_3PO_3$) was added thereto, which was well kneaded for 1 hour. Thereafter, the obtained mixture was thinly applied onto Al foil 15 μm thick, which was dried, followed by cutting into the predetermined size, and thus the cathode electrode in Sample 20 was obtained.

As for the produced cathode electrodes of Samples 1 to 20, the bending test was performed in order to examine the winding characteristics of the electrode in the case where the amount and type of additive agent is changed. The bending test was performed in the following manner. After drying, the cathode active materials of the cathode electrodes of Samples 1 to 20 were pressed so as to be a predetermined volume density. Further, the cathode electrodes after pressing were subjected to vacuum drying. Thereafter, the cathode electrodes were bent in half and the occurrence of breakage, cracking, or cutting of the coated foil was visually confirmed. Test results are shown in Table 3. In Table 3, the evaluation of breaking or cracking of a cathode electrode is indicated by a "○" mark or a "x" mark.

Samples 1 to 11 and laminating an outer face with aluminum. In this regard, the used electrolytic solution had a composition in which LiPF was dissolved in a mixed solvent prepared by mixing ethylene carbonate (EC) and diethyl carbonate (DEC) at a weight ratio of EC:DEC=3:7 so as to be $LiPF_6$ 1 mol/kg and further 5 parts by weight of vinylene carbonate (VC) was added thereto.

Next, the laminated cell thus fabricated was subjected to the following charge and discharge test and then the capacity maintenance rate after 500 cycles was determined.

TABLE 3

| | COMPOSITION OF CATHODE ACTIVE MATERIAL (MOLAR RATIO) | | | | ADDITION AMOUNT [parts by weight] | WINDING CHARACTERISTICS VOLUME DENSITY [g/cm³] (THICKNESS OF ELECTRODE [μm]) | | |
|---|---|---|---|---|---|---|---|---|
| | Ni | Co | Al | ADDITIVE | | 3.20-3.25 | 3.30-3.35 | 3.40-3.45 |
| SAMPLE 1 | 80 | 20 | 0 | $H_3PO_3$ | 0.05 | ○ (155 μm) | ○ (151 μm) | ○ (146 μm) |
| SAMPLE 2 | 80 | 20 | 0 | $H_3PO_3$ | 0.10 | ○ (192 μm) | ○ (186 μm) | ○ (181 μm) |
| SAMPLE 3 | 80 | 15 | 5 | $H_3PO_3$ | 0.20 | ○ (155 μm) | ○ (150 μm) | ○ (145 μm) |
| | | | | | | ○ (192 μm) | ○ (186 μm) | ○ (181 μm) |
| SAMPLE 4 | 80 | 15 | 5 | $H_3PO_3$ | 0.50 | ○ (192 μm) | ○ (186 μm) | ○ (181 μm) |
| | | | | | | ○ (213 μm) | ○ (207 μm) | ○ (202 μm) |
| SAMPLE 5 | 80 | 15 | 5 | $H_3PO_3$ | 1.0 | ○ (155 μm) | ○ (151 μm) | ○ (146 μm) |
| | | | | | | ○ (213 μm) | ○ (207 μm) | ○ (202 μm) |
| SAMPLE 6 | 80 | 15 | 5 | $H_3PO_3$ | 3.0 | ○ (210 μm) | ○ (204 μm) | ○ (199 μm) |
| | | | | | | ○ (234 μm) | ○ (228 μm) | ○ (222 μm) |
| SAMPLE 7 | 80 | 15 | 5 | $H_3PO_3$ | 5.0 | ○ (210 μm) | ○ (204 μm) | ○ (199 μm) |
| | | | | | | ○ (234 μm) | ○ (228 μm) | ○ (222 μm) |
| SAMPLE 8 | 98 | 1 | 1 | $H_3PO_3$ | 0.01 | ○ (139 μm) | ○ (135 μm) | ○ (132 μm) |
| SAMPLE 9 | 98 | 1 | 1 | $H_3PO_3$ | 0.10 | ○ (153 μm) | ○ (149 μm) | ○ (145 μm) |
| | | | | | | ○ (170 μm) | ○ (165 μm) | ○ (161 μm) |
| SAMPLE 10 | 98 | 1 | 1 | $H_3PO_3$ | 0.50 | ○ (153 μm) | ○ (149 μm) | ○ (145 μm) |
| | | | | | | ○ (170 μm) | ○ (165 μm) | ○ (161 μm) |
| SAMPLE 11 | 98 | 1 | 1 | $H_3PO_3$ | 1.0 | ○ (170 μm) | ○ (165 μm) | ○ (161 μm) |
| | | | | | | ○ (213 μm) | ○ (207 μm) | ○ (202 μm) |
| SAMPLE 12 | 80 | 15 | 5 | — | — | ○ (155 μm) | x (150 μm) | x (145 μm) |
| SAMPLE 13 | 80 | 15 | 5 | $H_3PO_3$ | 0.005 | ○ (155 μm) | x (150 μm) | x (145 μm) |
| SAMPLE 14 | 80 | 15 | 5 | $H_3PO_3$ | 7.0 | DIFFICULTY IN PRESSING DUE TO PEELING-OFF OF ACTIVE MATERIAL | | |
| SAMPLE 15 | 80 | 15 | 5 | $H_3PO_3$ | 3.0 | ○ (256 μm) | x (248 μm) | x (242 μm) |
| SAMPLE 16 | 80 | 15 | 5 | $H_3PO_3$ | 5.0 | ○ (256 μm) | ○ (248 μm) | x (242 μm) |
| SAMPLE 17 | 98 | 1 | 1 | — | — | ○ (153 μm) | x (149 μm) | x (145 μm) |
| SAMPLE 18 | 98 | 1 | 1 | $H_3PO_3$ | 0.005 | ○ (153 μm) | x (149 μm) | x (145 μm) |
| SAMPLE 19 | 98 | 1 | 1 | $H_3PO_3$ | 0.008 | ○ (170 μm) | x (165 μm) | x (161 μm) |
| SAMPLE 20 | 98 | 1 | 1 | $H_3PO_3$ | 6.0 | DIFFICULTY IN PRESSING DUE TO PEELING-OFF OF ACTIVE MATERIAL | | |

\* ○: CUTTING OR CRACKING OF ELECTRODES ARE NOT OBSERVED
x: CUTTING OR CRACKING OF ELECTRODES ARE OBSERVED

As shown in Table 3, in the cathodes of Samples 1 to 11, cutting or cracking of the electrodes was not occurred even when the volume density is in a range of 3.30 g/cm³ to 3.35 g/cm³ or in a range of 3.40 g/cm³ to 3.45 g/cm³. On the other hand, cutting or cracking of the electrodes was occurred in Samples 12, 13, 15, 17, 18, and 19. In the cathode of Sample 16, when the volume density is in a range of 3.40 g/cm³ to 3.45 g/cm³, cutting or cracking of the electrode was occurred. In the case of Samples 14 and 20, the active material could not be pressed due to its peeling.

A laminated cell (a size of 542436 and a rating of 1000 mAh) was fabricated by using the cathode electrodes of (Charge and Discharge Test)

The capacity maintenance rate was determined by the ratio of the discharge capacity of the 500th cycle at 23° C. to the discharge capacity of the 1st cycle at 23° C., namely, ("discharge capacity of the 500th cycle at 23° C."/"discharge capacity of the 1st cycle at 23° C.")×100. In this regard, the charging was performed at a constant current of 1 C under a constant voltage condition (up to the upper limit voltage of 4.2 V) and the discharging was performed at a constant current of 1 C (up to the final voltage of 2.5 V).

The measured results are shown in Table 4.

TABLE 4

| | ADDITIVE | ADDITION AMOUNT [parts by weight] | VOLUME DENSITY [g/cm³] (THICKNESS OF ELECTRODE) 3.40-3.45 | CAPACITY MAINTENANCE RATE (CAPACITY OF THE 500TH CYCLE/ CAPACITY OF THE 1ST CYCLE) [%] |
|---|---|---|---|---|
| SAMPLE 1 | $H_3PO_3$ | 0.05 | ○ (146 μm) | 74.0 |
| SAMPLE 2 | $H_3PO_3$ | 0.10 | ○ (181 μm) | 72.4 |

TABLE 4-continued

| | ADDITIVE | ADDITION AMOUNT [parts by weight] | VOLUME DENSITY [g/cm$^3$] (THICKNESS OF ELECTRODE) 3.40-3.45 | CAPACITY MAINTENANCE RATE (CAPACITY OF THE 500TH CYCLE/ CAPACITY OF THE 1ST CYCLE) [%] |
|---|---|---|---|---|
| SAMPLE 3 | $H_3PO_3$ | 0.20 | o (145 μm) | 74.2 |
| | | | o (181 μm) | 72.7 |
| SAMPLE 4 | $H_3PO_3$ | 0.50 | o (181 μm) | 72.0 |
| | | | o (202 μm) | 71.2 |
| SAMPLE 5 | $H_3PO_3$ | 1.0 | o (146 μm) | 73.1 |
| SAMPLE 6 | $H_3PO_3$ | 3.0 | o (199 μm) | 71.1 |
| | | | o (222 μm) | 70.0 |
| SAMPLE 7 | $H_3PO_3$ | 5.0 | o (199 μm) | 70.5 |
| | | | o (222 μm) | 70.1 |
| SAMPLE 8 | $H_3PO_3$ | 0.01 | o (132 μm) | 82.1 |
| SAMPLE 9 | $H_3PO_3$ | 0.10 | o (145 μm) | 76.1 |
| | | | o (161 μm) | 75.5 |
| SAMPLE 10 | $H_3PO_3$ | 0.50 | o (145 μm) | 76.3 |
| | | | o (161 μm) | 75.2 |
| SAMPLE 11 | $H_3PO_3$ | 1.0 | o (161 μm) | 75.0 |
| | | | o (202 μm) | 73.7 |

* o: CUTTING OR CRACKING OF ELECTRODES ARE NOT OBSERVED

As shown in Table 4, in the laminated cell formed by using cathodes of Samples 1 to 7, sufficient cycle characteristics were obtained. That is, it was confirmed that, when the lithium composite oxide containing higher proportion of nickel Ni than that of cobalt Co was used, sufficient cycle characteristics were obtained by adding phosphorous acid ($H_3PO_3$) in a range of 0.05 parts by weight to 5.0 parts by weight to 100 parts by weight of cathode active material. In the laminated cell formed by using cathodes of Samples 8 to 11, sufficient cycle characteristics were obtained. That is, it was confirmed that, when the lithium composite oxide containing lower proportion of nickel Ni than that of cobalt Co was used, sufficient cycle characteristics were obtained by adding phosphorous acid ($H_3PO_3$) in a range of 0.01 parts by weight to 1.0 parts by weight to 100 parts by weight of cathode active material.

Further, the cathode electrode was observed with an electron microscope. Electron micrographs of the surface of the cathode electrode in Samples 2 and 12 are shown in FIGS. 18A and 18B.

Figure 18A:
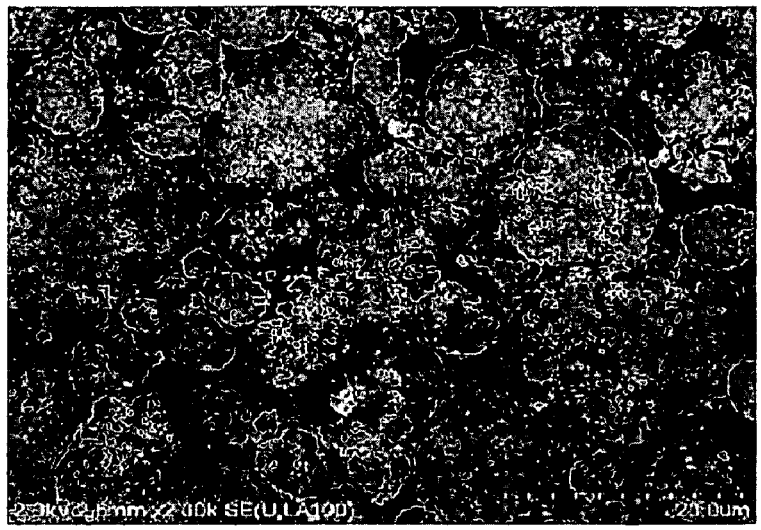
FIGS. 18A and 18B are electron micrographs of the surface of the cathode electrode in Samples 2 and 12.
Figure 18B:
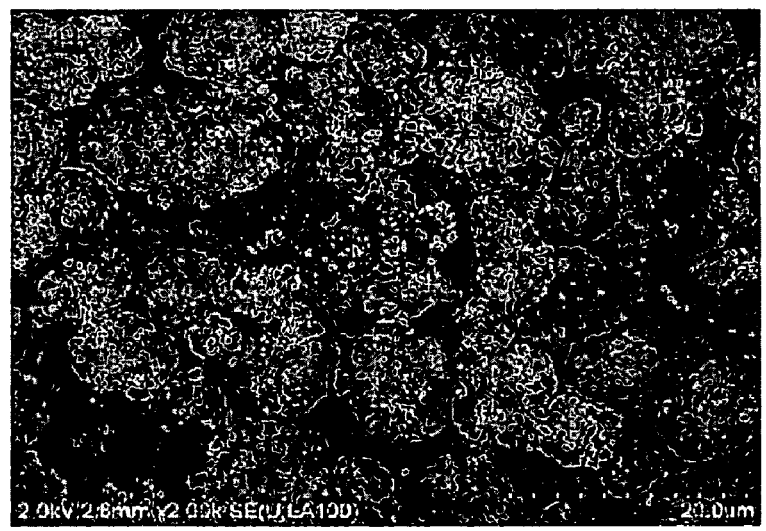

FIG. 18A is an electron micrograph of the surface of the cathode electrode in Sample 2. FIG. 18B is an electron micrograph of the surface of the cathode electrode in Sample 12. On the surface of Sample 12, the binder and the conductive auxiliary agent (black colored area) are incorporated into a gap between the primary particles of the cathode active material (gray area) and a net shape is formed. On the other hand, in Sample 1, the binder and the conductive auxiliary agent are hardly incorporated into a gap between the primary particles. It is considered that lower amounts of the binder and the conductive auxiliary agent between primary particles allow lithium ions to move easily.

Figure 19A:
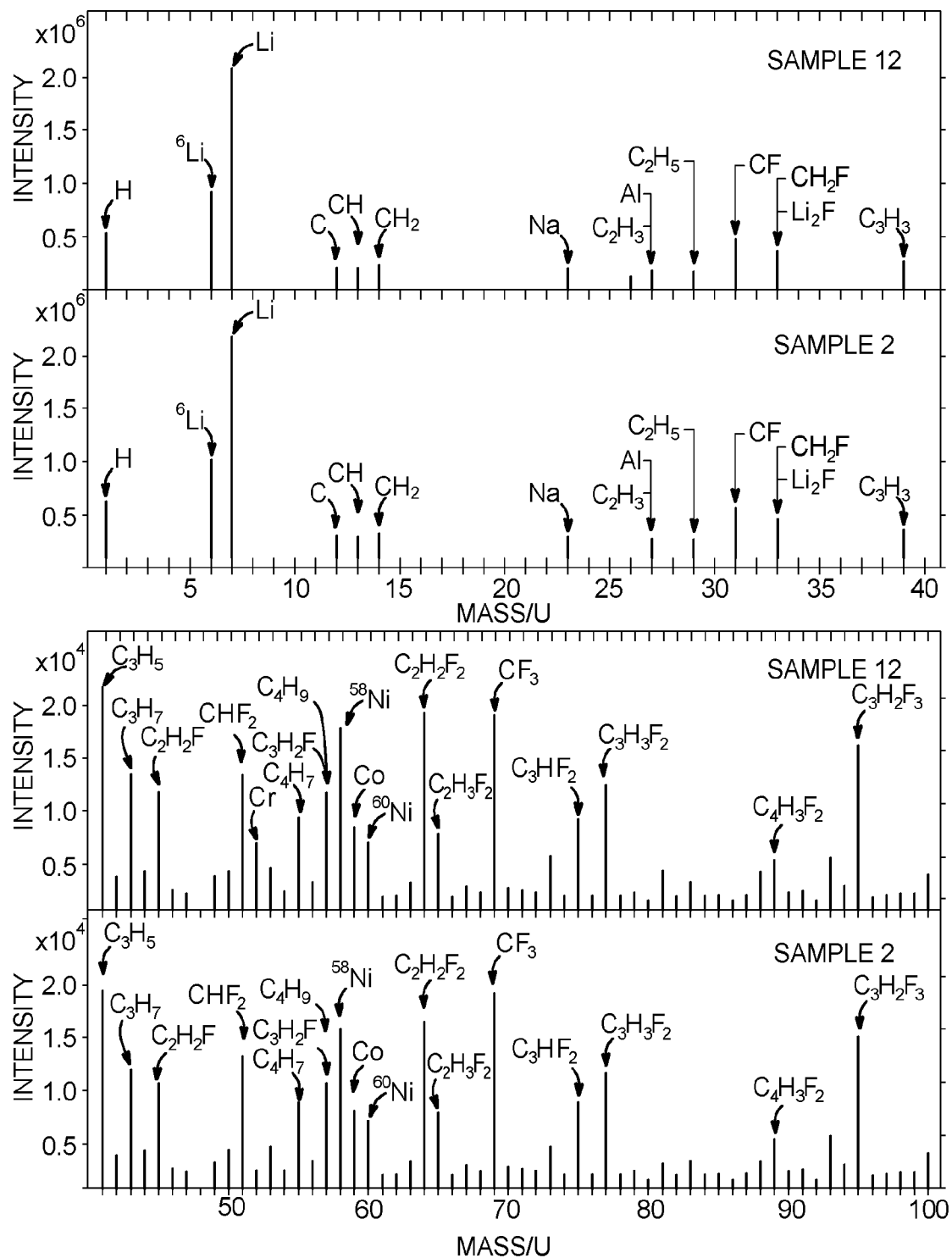
FIGS. 19A and 19B are graphs showing results of the cathode electrode in Samples 2 and 12 which are determined based on TOF-SIMS positive secondary ion mass spectrometry.
Figure 19B:
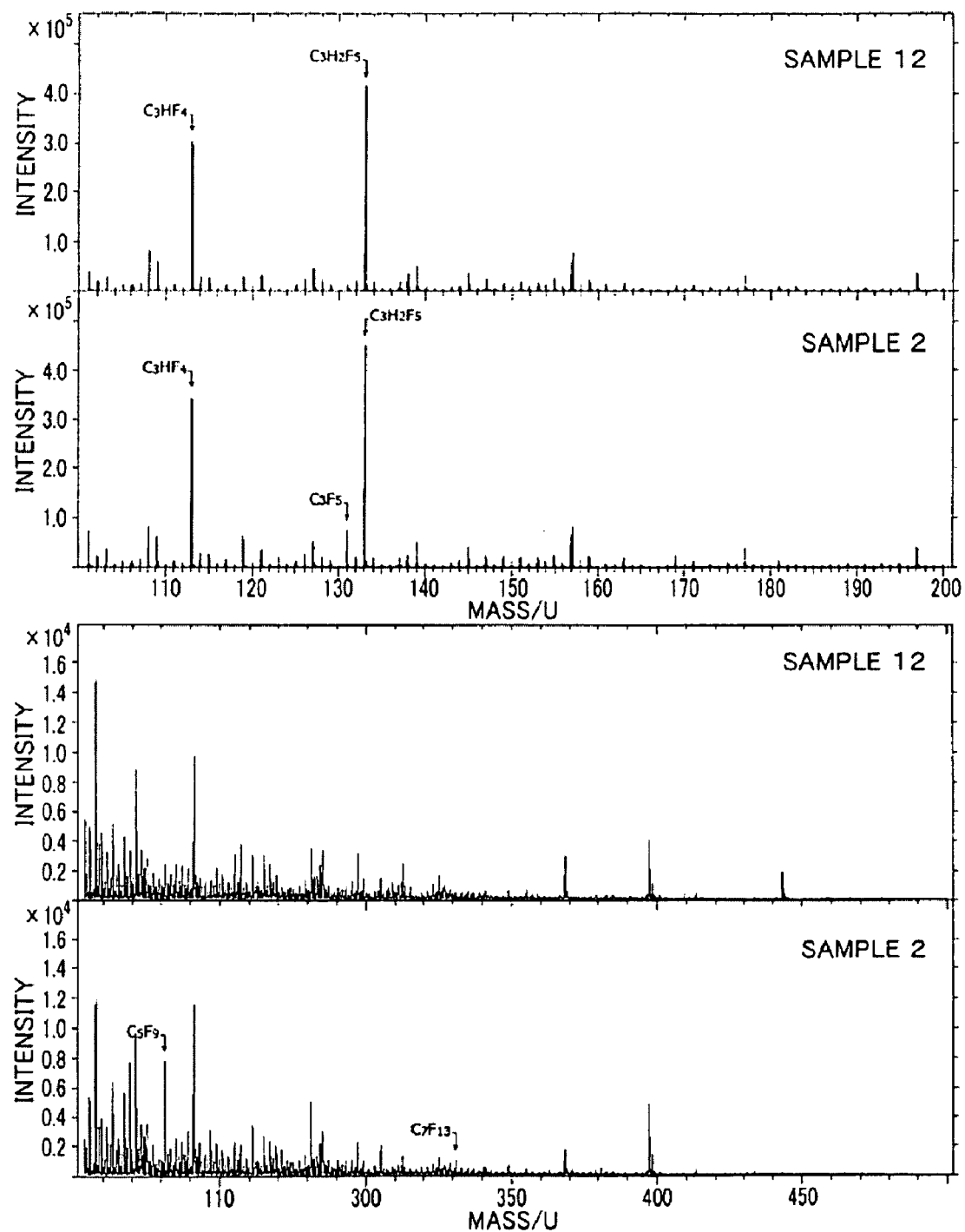
Figure 20A:
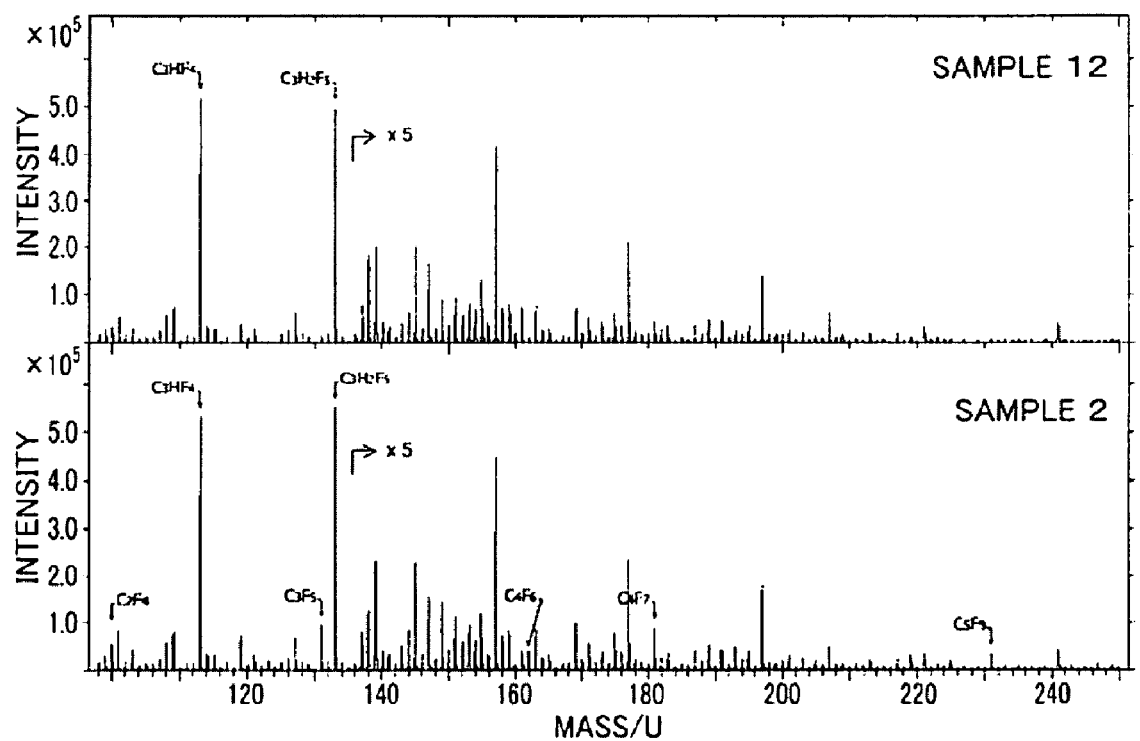
FIGS. 20A and 20B are graphs showing results of the cathode electrode in Samples 2 and 12 which are determined based on TOF-SIMS positive secondary ion mass spectrometry.
Figure 20B:
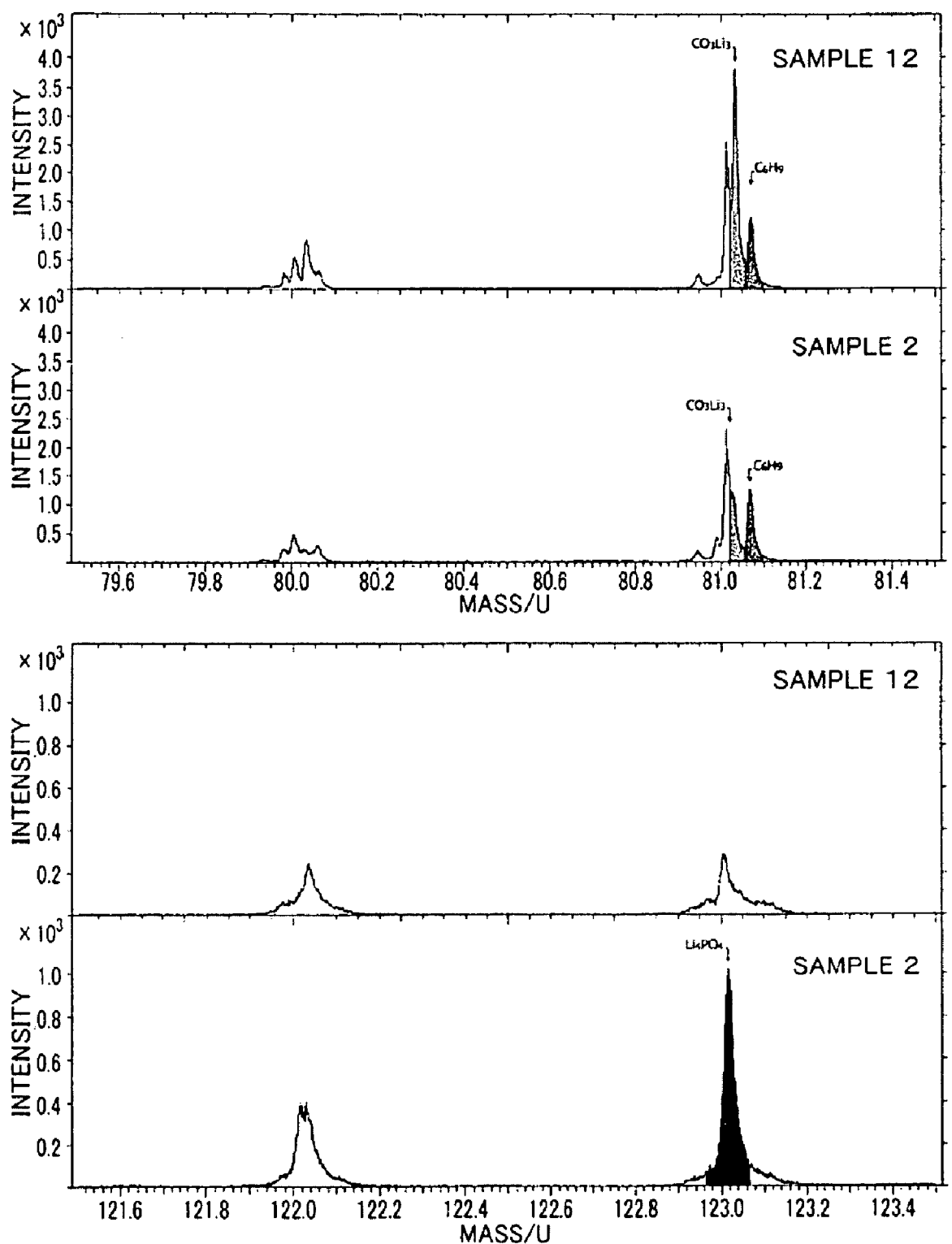

Further, the electrode surface of Samples 2 and 12 was determined by TOF-SIMS. The results of the cathode electrode in Samples 2 and 12 which are determined based on TOF-SIMS positive secondary ion mass spectrometry are shown in FIGS. 19A and 19B as well as FIGS. 20A and 20B. The results of the cathode electrode in Samples 2 and 12, which are determined based on TOF-SIMS negative secondary ion mass spectrometry, are shown in FIG. 21.

As shown in FIGS. 19 to 21, a peak of a fragment based on positive secondary ions of $C_3F_5$, $C_5F_9$, $C_7F_{13}$, and $Li_4PO_4$ and negative secondary ions of $PO_2$, $PO_3$, $LiP_2O_4$, $LiP_2O_5$, $LiP_2O_6$, $LiPO_2F$, $LiPO_3F$, $POF_2$, $PO_2F_2$, and $LiPO_3H$ was observed.

Figure 22:
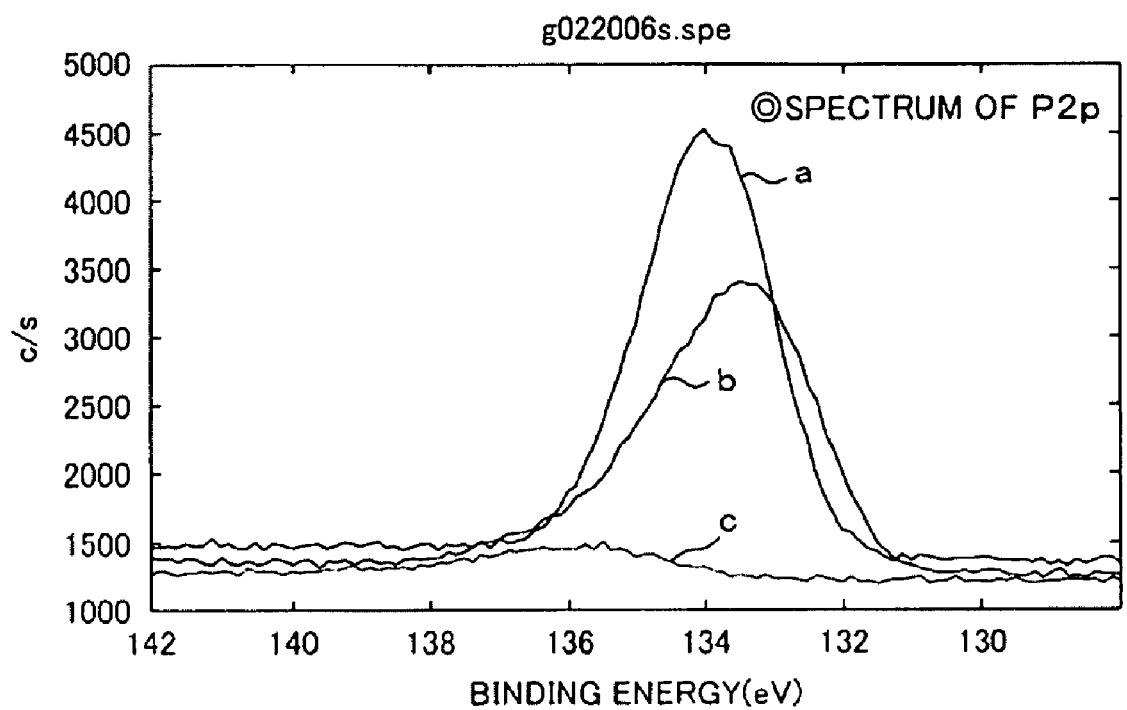
FIG. 22 is a graph showing results of the surface analysis by X-ray photoelectron spectroscopy in Samples 2 and 12.

Further, the results of the surface analysis by X-ray photoelectron spectroscopy in Samples 2 and 12 are shown in FIG. 22. The line a shows the analysis results of the cathode electrode before charging and discharging of Sample 2. The line b shows the analysis results of the cathode electrode after the first charging and discharging of Sample 2. The line c shows the analysis results of the cathode electrode after the first charging and discharging of Sample 12. Here, the cathode electrode after the first charging and discharging is the cathode electrode which is washed with dimethyl carbonate (DMC) after dismounting of the battery, followed by vacuum drying at 50° C.

As shown in FIG. 22, the P 2p spectrum derived from LiPF6 in the electrolytic solution used for the battery was also observed after the first charging and discharging in Sample 12, where phosphorous acid ($H_3PO_3$) was not added. The difference between Sample 12 and Sample 2 is clear from the difference of the peak intensity and a peak in the P 2p spectrum derived from the phosphorus compound contained in the cathode can be confirmed.

It should be understood by those skilled in the art that various modifications, combinations, sub-combinations and alterations may occur depending on design requirements and other factors insofar as they are within the scope of the appended claims or the equivalents thereof. For example, the cathode active material layer 13B may contain other cathode active materials in addition to the cathode active materials described above. Examples of other cathode active materials include a lithium manganese composite oxide having a spinel structure that contains lithium and manganese Mn.

In addition, as the batteries formed by using the cathode produced by the manufacture method according to an embodiment, the so-called lithium-ion secondary battery in which the capacity of the anode is represented by a capacity component determined by occlusion and release of lithium has been described in the above-mentioned embodiments and Examples. The present application can be similarly applied to the so-called lithium metal secondary battery in which lithium metal is used for the anode active material and the capacity of the anode is represented by a capacity component determined by precipitation and dissolution of lithium. Further, the present application can be similarly applied to the secondary battery in which the capacity of the anode is represented by the sum of the capacity component determined by occlusion and release of lithium and the capacity component determined by precipitation and dissolution of lithium by lowering the charging capacity of the anode material capable of occluding and releasing lithium than the charging of the cathode.

Furthermore, as the batteries formed by using the cathode produced by the manufacture method according to an embodiment, the secondary batteries a flat type, a cylindrical type, and a square type have been described in the above-mentioned embodiments and Examples. The present application can be similarly applied to the secondary batteries of a button type, a thin type, a large type, and a stacked lamination type. The present application can be applied to not only the secondary batteries but also the primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing a cathode, comprising the steps of:
   mixing phosphorous acid ($H_3PO_3$) with cathode active material to prepare a cathode mixture slurry; and
   applying the cathode mixture slurry to a cathode current collector to form a cathode active material layer;
   wherein the phosphorous acid ($H_3PO_3$) is mixed with the cathode active material, a conductive agent and a binder to form the cathode mixture slurry.

2. The method for manufacturing a cathode according to claim 1, wherein an addition amount of the phosphorous acid ($H_3PO_3$) is 0.01 parts by weight or more and 5.0 parts by weight or less to 100 parts by weight of the cathode active material.

3. The method for manufacturing a cathode according to claim 1, wherein the thickness of the cathode is 250 μm or less.

4. The method for manufacturing a cathode according to claim 1, wherein the cathode active material contains the lithium composite oxide with the average composition represented by Formula I:

$$Li_xCo_yNi_zM_{1-y-z}O_{b-a}X_a \qquad \text{(Chemical formula I)}$$

wherein M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and x, y, z, a, and b are values in the range of $0.8<x\leq1.2$, $0\leq y\leq1.0$, $0\leq z\leq1.0$, $1.8\leq b\leq2.2$, and $0\leq a\leq1.0$, respectively.

5. The method for manufacturing a cathode according to claim 4, wherein the cathode active material includes the lithium composite oxide which contains higher proportion of nickel Ni than that of cobalt Co among lithium composite oxides with the average composition represented by Formula I and an addition amount of the phosphorous acid ($H_3PO_3$) is 0.05 parts by weight or more and 5.0 parts by weight or less to 100 parts by weight of the cathode active material.

6. The method for manufacturing a cathode according to claim 4, wherein the cathode active material includes the lithium composite oxide which contains a lower proportion of nickel Ni than that of cobalt Co among lithium composite oxides with the average composition represented by Formula I and an addition amount of the phosphorous acid ($H_3PO_3$) is 0.01 parts by weight or more and 1.0 parts by weight or less to 100 parts by weight of the cathode active material.

7. The method for manufacturing a cathode according to claim 1, wherein the cathode is an electrode for nonaqueous electrolyte secondary batteries.

8. The method for manufacturing a cathode according to claim 7, wherein the nonaqueous electrolyte secondary battery has a flat or square shape.

9. The method for manufacturing a cathode according to claim 1, wherein the cathode active material is a lithium composite oxide with an average composition represented by Formula I:

$$Li_xCo_yNi_zM_{1-y-z}O_{b-a}X_a \qquad \text{(Chemical formula I)}$$

wherein M is one or more elements selected from the group consisting of boron B, magnesium Mg, aluminium Al, silicon Si, phosphorus P, sulfur S, titanium Ti, chromium Cr, manganese Mn, iron Fe, copper Cu, zinc Zn, gallium Ga, germanium Ge, yttrium Y, zirconium Zr, molybdenum Mo, silver Ag, barium Ba, tungsten W, indium In, tin Sn, lead Pb, and antimony Sb; X is halogen; and x, y, z, a, and b are values in the range of $0.8<x\leq1.2$, $0\leq y\leq1.0$, $0\leq z\leq1.0$, $1.8\leq b\leq2.2$, and $0\leq a\leq1.0$, respectively, and
wherein the lithium composite oxide contains more nickel than any other constituent metal element except lithium.

* * * * *